United States Patent
Sato

(10) Patent No.: US 8,103,510 B2
(45) Date of Patent: Jan. 24, 2012

(54) DEVICE CONTROL DEVICE, SPEECH RECOGNITION DEVICE, AGENT DEVICE, ON-VEHICLE DEVICE CONTROL DEVICE, NAVIGATION DEVICE, AUDIO DEVICE, DEVICE CONTROL METHOD, SPEECH RECOGNITION METHOD, AGENT PROCESSING METHOD, ON-VEHICLE DEVICE CONTROL METHOD, NAVIGATION METHOD, AND AUDIO DEVICE CONTROL METHOD, AND PROGRAM

(75) Inventor: Yasushi Sato, Chiba (JP)

(73) Assignee: Kabushikikaisha Kenwood, Tokyo (JP)

( * ) Notice: Subject to any disclaimer, the term of this patent is extended or adjusted under 35 U.S.C. 154(b) by 956 days.

(21) Appl. No.: 10/584,360

(22) PCT Filed: Dec. 24, 2004

(86) PCT No.: PCT/JP2004/019426
§ 371 (c)(1),
(2), (4) Date: May 24, 2007

(87) PCT Pub. No.: WO2005/064592
PCT Pub. Date: Jul. 14, 2005

(65) Prior Publication Data
US 2008/0048908 A1 Feb. 28, 2008

(30) Foreign Application Priority Data
Dec. 26, 2003 (JP) ................................. 2003-436976

(51) Int. Cl.
*G10L 11/00* (2006.01)

(52) U.S. Cl. .......................... 704/275; 704/270; 704/231

(58) Field of Classification Search .................. 704/270, 704/275, 231
See application file for complete search history.

(56) References Cited

U.S. PATENT DOCUMENTS 4,827,520 A 5/1989 Zeinstra
(Continued)

FOREIGN PATENT DOCUMENTS

EP 1 433 662 A2 6/2004
(Continued)

OTHER PUBLICATIONS

Office Action for Japanese Patent Application No. 2005-516667 mailed on May 18, 2010 with English Translation, 5 pages.

*Primary Examiner* — Douglas Godbold
(74) *Attorney, Agent, or Firm* — Kilpatrick Townsend & Stockton LLP

(57) ABSTRACT

A speech recognition unit (2) performs speech recognition on a speech of an utterer input by a speech input unit (1), specifies possible words which are represented by the speech, and the scores thereof, and a natural language analyzer (3) specifies parts of speech of the words and supplies word data representing the words to an agent processing unit (7). The agent processing unit (7) stores process item data which defines a data acquisition process to acquire word data or the like, a discrimination process, and an input/output process, and wires or data defining transition from one process to another and giving a weighting factor to the transition, and executes a flow represented generally by the process item data and the wires to thereby control devices belonging to an input/output target device group (6) in such a way as to adequately grasp a demand of the utterer and meet the demand.

36 Claims, 18 Drawing Sheets

U.S. PATENT DOCUMENTS

| | | | |
|---|---|---|---|
| 5,729,659 A * | 3/1998 | Potter | 704/270 |
| 6,076,061 A * | 6/2000 | Kawasaki et al. | 704/270 |
| 2003/0046088 A1* | 3/2003 | Yuschik | 704/276 |
| 2003/0065427 A1* | 4/2003 | Funk et al. | 701/1 |
| 2004/0193420 A1* | 9/2004 | Kennewick et al. | 704/257 |
| 2005/0096913 A1* | 5/2005 | Coffman et al. | 704/275 |
| 2005/0131699 A1* | 6/2005 | Fukada | 704/270 |
| 2005/0182619 A1* | 8/2005 | Azara et al. | 704/9 |
| 2005/0273336 A1* | 12/2005 | Chang et al. | 704/257 |
| 2006/0074658 A1* | 4/2006 | Chadha | 704/246 |
| 2006/0259299 A1* | 11/2006 | Kato et al. | 704/231 |
| 2007/0106493 A1* | 5/2007 | Sanfilippo et al. | 704/9 |

FOREIGN PATENT DOCUMENTS

| | | |
|---|---|---|
| EP | 1 493 993 A1 | 1/2005 |
| JP | 08-339288 A | 12/1996 |
| JP | 11-007447 | 1/1999 |
| JP | 2000-020086 A | 1/2000 |
| JP | 2000-330588 A | 11/2000 |
| JP | 2000330588 | 11/2000 |
| JP | 2001-249686 A | 9/2001 |
| JP | 2002-341892 A | 11/2002 |
| JP | 2003-044088 A | 2/2003 |

* cited by examiner

FIG. 3

| RECOGNIZED WORDS | CATEGORIES | | | |
| --- | --- | --- | --- | --- |
| | EATING | HOSPITAL | TRAVEL | NAVIGATION SETTING |
| "HETTA" | O | | | |
| "SUITA" | O | | | |
| "ONAKA" | O | O | | |
| "EAT" | O | | | |
| "GO" | O | O | O | O |
| "SETTING" | O | O | | O |
| "SOMEPLACE" | O | O | O | O |
| "WHERE" | O | | | |
| "EATING" | O | | | |
| "HURT" | | O | | |
| "HOSPITAL" | | O | | |
| "GOAL" | | | | O |

| TRIGGER ACQUISITION PROCESS SYMBOL : TG | TRANSITION CONSTANT k |
|---|---|
| TG00 : "NOT INTERESTING" | 0.7 |
| TG01 : "EATING" | 0.8 |
| TG51 : "JAPANESE FOOD" | 0.5 |
| TG52 : "WESTERN FOOD" | 0.5 |
| TG53 : "CHINESE FOOD" | 0.5 |
| ⋮ | ⋮ |

```
DISCRIMINATION          TRANSITION
  PROCESS               CONSTANT k
SYMBOL : BRxx

BR01 : WHAT TIME?   ~12:00         : 0.4
                    12:00~14:00    : 0.3
                    14:00~         : 0.4
```

| DETERMINATION PROCESS (INQUIRY MADE) SYMBOL : QBxx | TRANSITION CONSTANT k |
|---|---|
| QB01 : GO EATING? | Yes : 0.7   No : 0.4 |
| QB02 : THEN, GO TO CONVENIENCE STORE? | Yes : 0.5   No : 0.3 |
| ⋮ | ⋮ |

| OUTPUT PROCESS | TRANSITION CONSTANT k |
|---|---|
| SYMBOL : EXxx, SPxx | |
| EX02 : NAVIGATION GUIDE | 0.8 |
| ⋮ | ⋮ |
| SP02 : GUIDE FOR CONVENIENT STORE | 0.8 |
| SP03 : DRIVE CAREFULLY | 0.8 |
| ⋮ | ⋮ |

FIG. 8

| WIRE NUMBER | | PRECEDING NODE | FOLLOWING NODE | WEIGHTING FACTOR J |
|---|---|---|---|---|
| W1 | = | From (TG01.1) | To (CN01.1), | 1.0 |
| W2 | = | From (CN01.3) | To (EX01.1), | 0.5 |
| W3 | = | From (CN01.2) | To (QB01.1), | 0.5 |
| W4 | = | From (TG02.2) | To (EX03.1), | 1.0 |
| W5 | = | From (QB01.3) | To (EX03.1), | 0.5 |
| W6 | = | From (QB01.2) | To (EX02.1), | 0.5 |
| W7 | = | From (EX02.2) | To (TG03.3), | 0.5 |

FIG. 18

|  | "ONAKA" | "SOMEPLACE" | "GOAL" |
|---|---|---|---|
| "HETTA" | EATING | EATING |  |
| "HURT" | HOSPITAL | HOSPITAL |  |
| "SETTING" |  |  | NAVIGATION SETTING |
| "GO" | EATING | TRAVEL |  |

DEVICE CONTROL DEVICE, SPEECH
RECOGNITION DEVICE, AGENT DEVICE,
ON-VEHICLE DEVICE CONTROL DEVICE,
NAVIGATION DEVICE, AUDIO DEVICE,
DEVICE CONTROL METHOD, SPEECH
RECOGNITION METHOD, AGENT
PROCESSING METHOD, ON-VEHICLE
DEVICE CONTROL METHOD, NAVIGATION
METHOD, AND AUDIO DEVICE CONTROL
METHOD, AND PROGRAM

TECHNICAL FIELD

The present invention relates to a device control device, a speech recognition device, an agent device, an on-vehicle device control device, a navigation device, an audio device, a device control method, a speech recognition method, an agent processing method, an on-vehicle device control method, a navigation method, an audio device control method, and a program.

BACKGROUND ART

Recently, a scheme of recognizing speeches using a speech recognition technology, and controlling electric devices or the like in response to the recognition result is used. Specifically, the scheme identifies a word represented by an input speech, discriminates whether the identified word matches a predetermined keyword or not, and controls an external device based on the discrimination result (see, for example, Patent Literature 1).
Patent Literature 1: Unexamined Japanese Patent Application KOKAI Publication No. H8-339288

DISCLOSURE OF INVENTION

Problem to be Solved by the Invention

It is however difficult to completely recognize an instruction aurally uttered in the form of a language by a human. Accordingly, there is a case where the scheme cannot adequately respond to an instruction uttered in the form of a language by a human.
The present invention has been made in view of the above situation, and it is an object of the invention to provide a device control device, a speech recognition device, an agent device, an on-vehicle device control device, a navigation device, an audio device, a device control method, a 5 speech recognition method, an agent processing method, an on-vehicle device control method, a navigation method, an audio device control method, and a program, which can control a device adequately in response to an instruction uttered in the form of a language by a human.

Means for Solving the Problem

To achieve the object, a device control device according to the first aspect of the invention comprises:
speech recognition means which acquires speech data representing a speech and specifies words represented by the speech by performing speech recognition on the speech data;
specifying means (7) which specifies a content of the speech uttered by an utterer based on the words specified by the speech recognition means (2); and
process execution means (7) which specifies a content of control to be performed on an external device to be a control target based on the specified content, and performs the control.

The speech recognition means (2, 3) may include speech part specifying means (3) which specifies a part of speech of the specified words, and
the specifying means (7) may specify a content of the speech uttered by the utterer based only on those of the words specified by the speech recognition means (2) which are specified as a predetermined part of speech.
The specifying means (7) may discriminate whether or not a combination of a plurality of words in the words specified by the speech recognition means (2, 3) which is specified as a predetermined part of speech meets a predetermined condition, and specify a content of the speech uttered by the utterer based on a discrimination result.
The specifying means (7) may hold information which associates words with one or more categories, and specify a content of the speech uttered by the utterer based on a category in which the words specified by the speech recognition means are classified.
The specifying means (7) may hold correlation information which associates words of different meanings or different categories with each process of the process execution means (7), and specify a content of the speech uttered by the utterer based on a combination of those words or categories which are specified by the speech recognition mean, and the correlation information.
The specifying means (7) may hold information which associates words with one or more categories, and specify a content of the speech uttered by the utterer based on a category in which a plurality of words specified by the speech recognition means (2, 3) are commonly classified.
The specifying means (7) may hold a plurality of words assigned to respective processes of the process execution means (7), and perform a corresponding process when at least one of the words specified by the speech recognition means (2, 3) is a word assigned to the process.
When a meaning of an input speech is not discriminatable, the specifying means (7) may prompt an input in a more discriminatable expression.
The device may further comprise information acquisition means (7) which acquires information from an external device, and the specifying means (7) may select an output content to be output based on the information acquired by the information acquisition means (7).
A device control device according to the second aspect of the invention comprises:
speech recognition means (2, 3) which acquires speech data representing a speech and specifies words represented by the speech by performing speech recognition on the speech data;
specifying means (7) which specifies a content of the speech uttered by an utterer based on the words specified by the speech recognition means (2, 3);
process specifying means (7) which specifies a content of control to be performed on an external device to be a control target based on the specified content;
information acquisition means (7) which acquires information via predetermined communication means (7); and
speech output means (5) which outputs a speech based on the information acquired by the information acquisition means (7),
whereby when the control specified by the process specifying means (7) is to output information acquired by the information acquisition means (7), the speech output means (5) outputs a speech based on the information.

A speech recognition device according to the third aspect of the invention comprises:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a process to be performed based on the specified content, and performs the process.

The speech recognition means (2, 3) may include speech part specifying means (3) which specifies a part of speech of the specified words, and the specifying means (7) may specify a content of the speech uttered by the utterer based only on those of the words specified by the speech recognition means (2, 3) which are specified as a predetermined part of speech.

The specifying means (7) may hold information which associates words with one or more categories, and specify a content of the speech uttered by the utterer based on a category in which the words specified by the speech recognition means are classified.

The specifying means (7) may hold correlation information which associates words of different meanings or different categories with each process of the process execution means (7), and specify a content of the speech uttered by the utterer based on a combination of those words or categories which are specified by the speech recognition means, and the correlation information.

The specifying means (7) may hold information which associates words with one or more categories, and specify a content of the speech uttered by the utterer based on a category in which a plurality of words specified by the speech recognition means are commonly classified.

The specifying means (7) may hold a plurality of words assigned to respective processes of the process execution means (7), and perform a corresponding process when at least one of the words specified by the speech recognition means (2, 3) is a word assigned to the process.

When a meaning of an input speech is not discriminatable, the specifying means (7) may prompt an input in a more discriminatable expression.

The device may further comprise information acquisition means (7) which acquires information from an external device, and the specifying means (7) may select an output content to be output based on the information acquired by the information acquisition means (7).

A speech recognition device according to the fourth aspect of the invention comprises:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a process to be performed based on the specified content;

information acquisition means (7) which acquires information via predetermined communication means (7); and speech output means (5) which outputs a speech based on the information acquired by the information acquisition means (7), whereby when the process specified by the process specifying means (7) is to output information acquired by the information acquisition means (7), the speech output means (5) outputs a speech based on the information.

An agent device according to the fifth aspect of the invention comprises:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a process to be performed based on the specified content, and performs the process.

The speech recognition means (2, 3) may include speech part specifying means (3) which specifies a part of speech of the specified words, and the specifying means (7) may specify a content of the speech uttered by the utterer based only on those of the words specified by the speech recognition means (2, 3) which are specified as a predetermined part of speech.

The specifying means (7) may discriminate whether or not a combination of a plurality of words in the words specified by the speech recognition means (2, 3) which is specified as a predetermined part of speech meets a predetermined condition, and specify a content of the speech uttered by the utterer based on a discrimination result.

The specifying means (7) may hold information which associates words with one or more categories, and specify a content of the speech uttered by the utterer based on a category in which the words specified by the speech recognition means are classified.

The specifying means (7) may hold correlation information which associates words of different meanings or different categories with each process of the process execution means (7), and specify a content of the speech uttered by the utterer based on a combination of those words or categories which are specified by the speech recognition means (2, 3), and the correlation information.

The specifying means (7) may hold information which associates words with one or more categories, and specify a content of the speech uttered by the utterer based on a category in which a plurality of words specified by the speech recognition means (2, 3) are commonly classified.

The specifying means (7) may hold a plurality of words assigned to respective processes of the process execution means (7), and perform a corresponding process when at least one of the words specified by the speech recognition means (2, 3) is a word assigned to the process.

When a meaning of an input speech is not discriminatable, the specifying means (7) may prompt an input in a more discriminatable expression.

The device may further comprise information acquisition means (7) which acquires information from an external device, and the specifying means (7) may select an output content to be output based on the information acquired by the information acquisition means (7).

The process execution means (7) may include means which, when the process specified as a process to be performed is a process of presenting information externally received to the utterer, performs the presentation by generating a speech which reads out the information.

An agent device according to the sixth aspect of the invention comprises:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a process to be performed based on the specified content;

information acquisition means (7) which acquires information via predetermined communication means (74); and speech output means (5) which outputs a speech based on the information acquired by the information acquisition means (7), whereby when the process specified by the process specifying means (7) is to output information acquired by the information acquisition means (7), the speech output means (5) outputs a speech based on the information.

An on-vehicle device control device according to the seventh aspect of the invention is an on-vehicle device control device so constructed as to be mountable on a vehicle having an external on-vehicle device mounted thereon, and comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of control to be performed on the on-vehicle device based on the specified content, and performs the control.

The speech recognition means (2, 3) may include speech part specifying means (3) which specifies a part of speech of the specified words, and the specifying means (7) may specify a content of the speech uttered by the utterer based only on those of the words specified by the speech recognition means (2, 3) which are specified as a predetermined part of speech.

The specifying means (7) may hold information which associates words with one or more categories, and specify a content of the speech uttered by the utterer based on a category in which the words specified by the speech recognition means (2, 3) are classified.

The specifying means (7) may hold correlation information which associates words of different meanings or different categories with each process of the process execution means (7), and specify a content of the speech uttered by the utterer based on a combination of those words or categories which are specified by the speech recognition means, and the correlation information.

The specifying means (7) may hold information which associates words with one or more categories, and specify a content of the speech uttered by the utterer based on a category in which a plurality of words specified by the speech recognition means (2, 3) are commonly classified.

The specifying means (7) may hold a plurality of words assigned to respective processes of the process execution means (7), and perform a corresponding process when at least one of the words specified by the speech recognition means (2, 3) is a word assigned to the process.

When a meaning of an input speech is not discriminatable, the specifying means (7) may prompt an input in a more discriminatable expression.

The device may further comprise information acquisition means (7) which acquires information from an external device, and the specifying means (7) may select an output content to be output based on the information acquired by the information acquisition means (7).

An on-vehicle device control device according to the eighth aspect of the invention is an on-vehicle device control device so constructed as to be mountable on a vehicle having an external on-vehicle device mounted thereon, and comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a content of control to be performed on the on-vehicle device control device based on the specified content;

information acquisition means (7) which acquires information via predetermined communication means (74); and speech output means (5) which outputs a speech based on the information acquired by the information acquisition means (7), whereby when the control specified by the process specifying means (7) is to output information acquired by the information acquisition means (7), the speech output means (5) outputs a speech based on the information.

A navigation device according to the ninth aspect of the invention is a navigation device so constructed as to be mountable on a vehicle, and comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of a navigation process to be performed based on the specified content, and performs the navigation process.

The recognition means (2, 3) may include speech part specifying means (3) which specifies a part of speech of the specified words, and the specifying means (7) may specify a content of the speech uttered by the utterer based only on those of the words specified by the speech recognition means (2, 3) which are specified as a predetermined part of speech.

The specifying means (7) may hold information which associates words with one or more categories, and specify a content of the speech uttered by the utterer based on a category in which the words specified by the speech recognition means (2, 3) are classified.

The specifying means (7) may hold correlation information which associates words of different meanings or different categories with each process of the process execution means (7), and specify a content of the speech uttered by the utterer based on a combination of those words or categories which are specified by the speech recognition means (2, 3), and the correlation information.

The specifying means (7) may hold information which associates words with one or more categories, and specify a content of the speech uttered by the utterer based on a category in which a plurality of words specified by the speech recognition means (2, 3) are commonly classified.

The specifying means (7) may hold a plurality of words assigned to respective processes of the process execution means (7), and perform a corresponding process when at least one of the words specified by the speech recognition means (2, 3) is a word assigned to the process.

When a meaning of an input speech is not discriminatable, the specifying means (7) may prompt an input in a more discriminatable expression.

The device may further comprise information acquisition means (7) which acquires information from an external device, and the specifying means (7) may select an output content to be output based on the information acquired by the information acquisition means (7).

A navigation device according to the tenth aspect of the invention is a navigation device so constructed as to be mountable on a vehicle, and comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a content of a navigation process to be performed based on the specified content;

information acquisition means (7) which acquires information via predetermined communication means (74); and speech output means (5) which outputs a speech based on the information acquired by the information acquisition means (7), whereby when the navigation process specified by the process specifying means (7) is to output information acquired by the information acquisition means (7), the speech output means outputs a speech based on the information.

An audio device according to the eleventh aspect of the invention comprises:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of a speech process to be performed based on the specified content, and performs the speech process, or controls an external device in such a way as to cause the external device to perform the speech process.

The speech recognition means (2, 3) may include speech part specifying means (3) which specifies a part of speech of the specified words, and the specifying means (7) may specify a content of the speech uttered by the utterer based only on those of the words specified by the speech recognition means (2, 3) which are specified as a predetermined part of speech.

The specifying means (7) may hold information which associates words with one or more categories, and specify a content of the speech uttered by the utterer based on a category in which the words specified by the speech recognition means (2, 3) are classified.

The specifying means (7) may hold correlation information which associates words of different meanings or different categories with each process of the process execution means (7), and specify a content of the speech uttered by the utterer based on a combination of those words or categories which are specified by the speech recognition means (2, 3), and the correlation information.

The specifying means (7) may hold information which associates words with one or more categories, and specify a content of the speech uttered by the utterer based on a category in which a plurality of words specified by the speech recognition means (2, 3) are commonly classified.

The specifying means (7) may hold a plurality of words assigned to respective processes of the process execution means (7), and perform a corresponding process when at least one of the words specified by the speech recognition means (2, 3) is a word assigned to the process.

When a meaning of an input speech is not discriminatable, the specifying means (7) may prompt an input in a more discriminatable expression.

The device may further comprise information acquisition means (7) which acquires information from an external device, and the specifying means (7) may select an output content to be output based on the information acquired by the information acquisition means (7).

An audio device according to the twelfth aspect of the invention comprises:

speech recognition means (2, 3) which acquires speech data representing a speech and specifies words represented by the speech by performing speech recognition on the speech data;

specifying means which specifies a content of the speech uttered by an utterer based on the words specified by the speech recognition means (2, 3);

process specifying means (7) which specifies a content of a speech process to be performed based on the specified content;

information acquisition means (7) which acquires information via predetermined communication means (74); and speech output means (5) which outputs a speech based on the information acquired by the information acquisition means (7), whereby when the speech process specified by the process specifying means (7) is to output information acquired by the information acquisition means (7), the speech output means (5) outputs a speech based on the information.

A device control method according to the thirteenth aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step; and a process execution step of specifying a content of control to be performed on an external device to be a control target based on the specified content, and performing the control.

A device control method according to the fourteenth aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step;

a process specifying step of specifying a content of control to be performed on an external device to be a control target based on the specified content;

an information acquisition step of acquiring information via a predetermined communication device; and a speech output step of outputting a speech based on the information acquired in the information acquisition step, whereby when the control specified in the process specifying step is to output information acquired in the information acquisition step, a speech is output based on the information in the speech output step.

A speech recognition method according to the fifteenth aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step; and a process execution step of specifying specifies a process to be performed based on the specified content, and performing the process.

A speech recognition method according to the sixteenth aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step;

a process specifying step of specifying a process to be performed based on the specified content;

an information acquisition step of acquiring information via a predetermined communication device; and a speech output step of outputting a speech based on the information acquired in the information acquisition step, whereby when the process specified in the process specifying step is to output information acquired in the information acquisition step, a speech is output based on the information in the speech output step.

An agent processing method according to the seventeenth aspect of the invention comprises:

a speech recognition step of acquiring speech data representing a speech and specifies words represented by the speech by performing speech recognition on the speech data;

a specifying step of specifying specifies a content of the speech uttered by an utterer based on the words specified in the speech recognition step; and a process execution step of specifying a process to be performed based on the specified content, and performing the process.

An agent processing method according to the eighteenth aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step;

a process specifying step of specifying a process to be performed based on the specified content;

an information acquisition step of acquiring information via a predetermined communication device; and a speech output step of outputting a speech based on the information acquired in the information acquisition step, whereby when the process specified in the process specifying step is to output information acquired in the information acquisition step, a speech is output based on the information in the speech output step.

An on-vehicle device control method according to the nineteenth aspect of the invention is an on-vehicle device control method for controlling an on-vehicle device mounted on a vehicle, comprising:

a speech recognition step of acquiring speech data representing a speech and specifies words represented by the speech by performing speech recognition on the speech data;

a specifying step of specifying a content of the speech uttered by an utterer based on the words specified in the speech recognition step; and a process execution step of specifying a content of control to be performed on the on-vehicle device based on the specified content, and performing the control.

An on-vehicle device control method according to the twentieth aspect of the invention is an on-vehicle device control method for controlling an on-vehicle device mounted on a vehicle, comprising:

a speech recognition step of acquiring speech data representing a speech and specifies words represented by the speech by performing speech recognition on the speech data;

a specifying step of specifying a content of the speech uttered by an utterer based on the words specified in the speech recognition step:

a process specifying step of specifying a content of control to be performed on the on-vehicle device control device based on the specified content;

an information acquisition step of acquiring information via a predetermined communication device; and a speech output step of outputting a speech based on the information acquired in the information acquisition step, whereby when the control specified in the process specifying step is to output information acquired in the information acquisition step, a speech is output based on the information in the speech output step.

A navigation method according to the twenty-first aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step; and a process execution step of specifying a content of a navigation process to be performed based on the specified content, and performing the navigation process.

A navigation method according to the twenty-second aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step;

a process specifying step of specifying a content of a navigation process to be performed based on the specified content;

an information acquisition step of acquiring information via a predetermined communication device; and a speech output step of outputting a speech based on the information acquired in the information acquisition step, whereby when the navigation process specified in the process specifying step is to output information acquired in the information acquisition step, a speech is output based on the information in the speech output.

An audio device control method according to the twenty-third aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step; and a process execution step of specifying a content of a speech process to be performed based on the specified content, and performing the speech process, or controlling an external audio device in such a way as to cause the external device to perform the speech process.

An audio device control method according to the twenty-fourth aspect of the invention comprises:

a speech recognition step of acquiring speech data representing a speech and specifies words represented by the speech by performing speech recognition on the speech data;

a specifying step of specifying a content of the speech uttered by an utterer based on the words specified in the speech recognition step;

a process specifying step of specifying a content of a speech process to be performed by an external audio device based on the specified content;

an information acquisition step of acquiring information via a predetermined communication device; and a speech output step of outputting a speech based on the information acquired in the information acquisition step, whereby when the speech process specified in the process specifying step is to output information acquired in the information acquisition step, a speech is output based on the information in the speech output step.

A program according to the twenty-fifth aspect of the invention allows a computer to function as a device control device comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of control to be performed on an external device to be a control target based on the specified content, and performs the control.

A program according to the twenty-sixth aspect of the invention allows a computer to function as a device control device comprising:

speech recognition means (2, 3) which acquires speech data representing a speech and specifies words represented by the speech by performing speech recognition on the speech data;

specifying means which specifies a content of the speech uttered by an utterer based on the words specified by the speech recognition means (2, 3);

process specifying means (7) which specifies a content of control to be performed on an external device to be a control target based on the specified content;

information acquisition means (7) which acquires information via predetermined communication means (7); and speech output means (5) which outputs a speech based on the information acquired by the information acquisition means (7), whereby when the control specified by the process specifying means (7) is to output information acquired by the information acquisition means (7), the speech output means (5) outputs a speech based on the information.

A program according to the twenty-seventh aspect of the invention allows a computer to function as a speech recognition device comprising:

speech recognition means (2, 3) which acquires speech data representing a speech and specifies words represented by the speech by performing speech recognition on the speech data;

specifying means which specifies a content of the speech uttered by an utterer based on the words specified by the speech recognition means (2, 3); and process execution means (7) which specifies a process to be performed based on the specified content, and performs the process.

A program according to the twenty-eighth aspect of the invention allows a computer to function as a speech recognition device comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a process to be performed based on the specified content;

information acquisition means (7) which acquires information via predetermined communication means (74); and speech output means (5) which outputs a speech based on the information acquired by the information acquisition means (7), whereby when the process specified by the process specifying means (7) is to output information acquired by the information acquisition means (7), the speech output means (5) outputs a speech based on the information.

A program according to the twenty-ninth aspect of the invention allows a computer to function as an agent device comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a process to be performed based on the specified content, and performs the process.

A program according to the thirtieth aspect of the invention allows a computer to function as an agent device comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a process to be performed based on the specified content;

information acquisition means (7) which acquires information via predetermined communication means (74); and speech output means (5) which outputs a speech based on the information acquired by the information acquisition means (7), whereby when the process specified by the process specifying means (7) is to output information acquired by the information acquisition means (7), the speech output means (5) outputs a speech based on the information.

A program according to the thirty-first aspect of the invention allows a computer to function as an on-vehicle device control device so constructed as to be mountable on a vehicle having an external on-vehicle device mounted thereon, comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of control to be performed on the on-vehicle device based on the specified content, and performs the control.

A program according to the thirty-second aspect of the invention allows a computer to function as an on-vehicle device control device so constructed as to be mountable on a vehicle having an external on-vehicle device mounted thereon, comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means which specifies a content of control to be performed on the on-vehicle device control device based on the specified content;

information acquisition means (7) which acquires information via predetermined communication means (74); and speech output means (5) which outputs a speech based on the information acquired by the information acquisition means (7), whereby when the control specified by the process specifying means (7) is to output information acquired by the information acquisition means (7), the speech output means (5) outputs a speech based on the information.

A program according to the thirty-third aspect of the invention allows a computer to function as a navigation device so constructed as to be mountable on a vehicle, comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of a navigation process to be performed based on the specified content, and performs the navigation process.

A program according to the thirty-fourth aspect of the invention allows a computer to function as a navigation device so constructed as to be mountable on a vehicle, comprising:

speech recognition means which acquires speech data representing a speech and specifies words represented by the speech by performing speech recognition on the speech data;

specifying means which specifies a content of the speech uttered by an utterer based on the words specified by the speech recognition means (2, 3);

process specifying means which specifies a content of a navigation process to be performed based on the specified content;

information acquisition means (7) which acquires information via predetermined communication means (74); and speech output means (5) which outputs a speech based on the information acquired by the information acquisition means (7), whereby when the navigation process specified by the process specifying means (7) is to output information acquired by the information acquisition means (7), the speech output means outputs a speech based on the information.

A program according to the thirty-fifth aspect of the invention allows a computer to function as an audio device comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3); and process execution means (7) which specifies a content of a speech process to be performed based on the specified content, and performs the speech process, or controls an external device in such a way as to cause the external device to perform the speech process.

A program according to the thirty-sixth aspect of the invention allows a computer to function as an audio device comprising:

speech recognition means (2, 3) which acquires speech data representing a speech and specifies words represented by the speech by performing speech recognition on the speech data;

specifying means (7) which specifies a content of the speech uttered by an utterer based on the words specified by the speech recognition means (2, 3);

process specifying means (7) which specifies a content of a speech process to be performed based on the specified content;

information acquisition means (7) which acquires information via predetermined communication means (74); and speech output means (5) which outputs a speech based on the information acquired by the information acquisition means (7), whereby when the speech process specified by the process specifying means (7) is to output information acquired by the information acquisition means (7), the speech output means (5) outputs a speech based on the information.

EFFECT OF THE INVENTION

The present invention realizes a device control device, a speech recognition device, an agent device, an on-vehicle device control device, a navigation device, an audio device, a device control method, a speech recognition method, an on-vehicle device control method, a navigation method, an audio device control method, and a program, which can control a device adequately in response to an instruction uttered in the form of a language by a human.

BRIEF DESCRIPTION OF DRAWINGS

[FIG 3] A diagram exemplarily showing a specific example of a category dictionary.

[FIG 8] A diagram showing wires.

[FIG 18] A diagram showing a data structure of a table.

Figure 1:
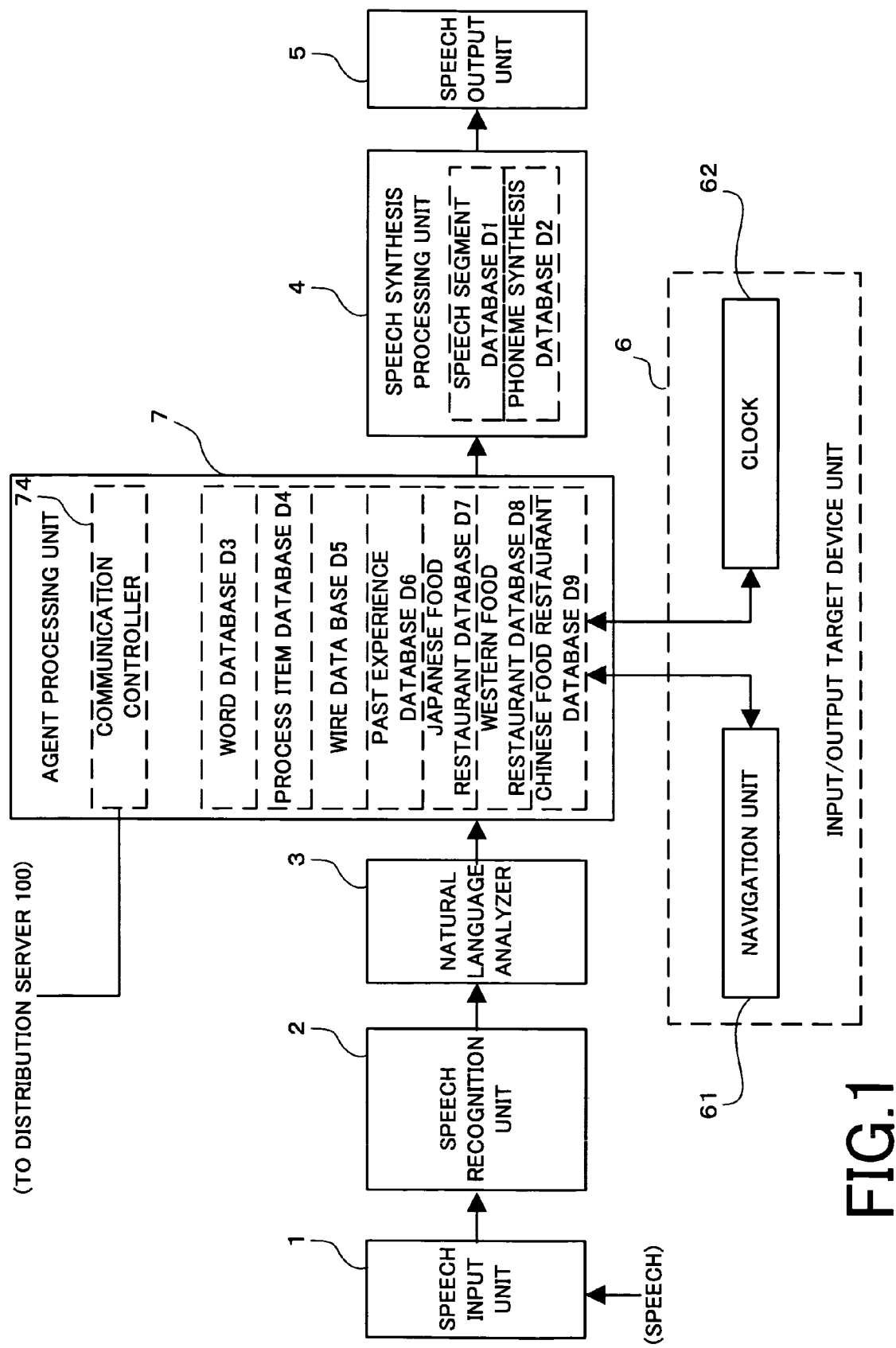
[FIG 1] A diagram showing an agent device according to an embodiment of the present invention.

EXPLANATION OF REFERENCE NUMERALS 1 speech input unit
2 speech recognition unit
3 natural language analyzer
4 speech synthesis processing unit
5 speech output unit
6 input/output target device group
61 navigation unit
62 clock
7 agent processing unit

BEST MODE FOR CARRYING OUT THE INVENTION

Embodiments of the present invention will be explained below by referring to the accompanying drawings.

First Embodiment

To begin with, an agent device according to a first embodiment of the invention will be explained. The agent device performs a process by transitioning the state according to input information. Hereinbelow, the agent device functions as an on-vehicle navigation device. A part of the agent device functions as a speech recognition device.

FIG. 1 is a block diagram showing the structure of the agent device. As illustrated, the agent device comprises a speech input unit 1, a speech recognition unit 2, a natural language analyzer 3, a speech synthesis processing unit 4, a speech output unit 5, an input/output target device group 6, and an agent processing unit 7.

Figure 2:
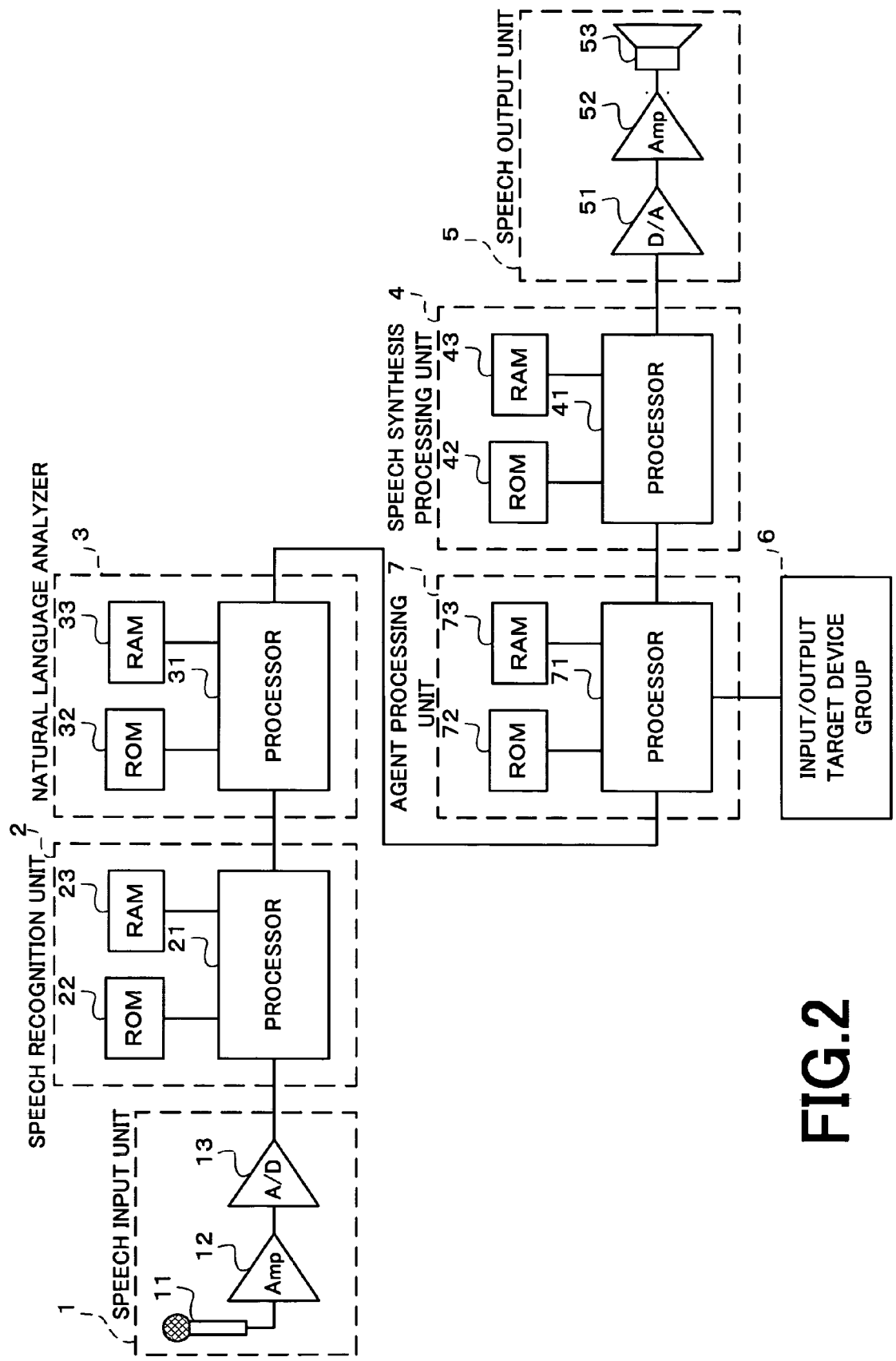
[FIG 2] A more detailed structural diagram of the agent device according to the embodiment.

The speech input unit 1 receives a speech, generates speech data of a digital form from the input speech, and supplies the speech data to the speech recognition unit 2. Specifically, the speech input unit 1 comprises, for example, a microphone 11, an AF (Audio Frequency) amplifier 12, and an A/D (Analog-to-Digital) converter 13 incorporating a sample and hold circuit as shown in FIG. 2. The microphone 11 converts a speech to a speech signal, and outputs the signal. The AF amplifier 12 amplifies the speech signal from the microphone 11, and outputs the signal. The A/D converter 13 performs sampling and A/D conversion of the amplified speech signal from the AF amplifier 12, generating digital speech data, and supplies the data to the speech recognition unit 2.

As shown in FIG. 2, each of the speech recognition unit 2, the natural language analyzer 3, the speech synthesis processing unit 4 and the agent processing unit 7 comprises a processor 21, 31, 41, 71 comprising, for example, a CPU (Central Processing Unit), a non-volatile memory 22, 32, 42, 72, such as a ROM (Read Only Memory) or a hard disk drive, which stores a program to be run by the processor 21, 31, 41, 71 (a ROM will be explained as an example in the embodiment), and a volatile memory 23, 33, 43, 73, such as a RAM (Random Access Memory), which has a memory area to be a work area for the processor.

A part or all of the functions of the speech recognition unit 2, the natural language analyzer 3, the speech synthesis processing unit 4, and the agent processing unit 7 may be achieved by a single processor, or a single non-volatile memory and a single volatile memory.

The speech recognition unit 2 performs a speech recognition process on speech data supplied from the speech input unit 1. When supplied with speech data from the speech input unit 1, the speech recognition unit 2 performs a process of, for example, canceling noise contained in the speech data, and then specifies all possible word candidates represented by the speech data and likelihoods (scores) S of the candidates by referring to a word database D3 in the agent processing unit 7 to be described later and performing a speech recognition process on the speech data.

Specifically, the speech recognition unit 2 calculates the degrees of matching of, for example, an input speech with all the words registered in the word database D3, i.e., the likelihoods (scores) S, to see which word has the highest score S. When speech data representing a sentence "uh, ??? ga hettayo" (where hettayo means decreasing, reducing, hungry, etc. in Japanese) is supplied, and the portion "???" represents a speech which can be recognized as "onaka" (meaning stomach in Japanese) and "ohaka" (meaning grave in Japanese), the scores S for the respective words, e.g., the score S of 80% for the word "onaka" and the score S of 65% for the word "ohaka", are calculated for the portion "???". Then, "onaka" showing the highest score is selected as the word represented by the portion "???". The speech recognition unit 2 generates a sequence of text characters (or word ID (IDentifier)) indicating the result of recognition of "uh, onaka ga hettayo" (meaning that my stomach is hungry in Japanese), and supplies it to the natural language analyzer 3.

A scheme for speech recognition which is performed by the speech recognition unit 2 is arbitrary. A word the value of whose score S is smaller than a predetermined value may not be selected as a candidate. Further, a plurality of word candidates may be specified for a single speech input. Then, data indicating a specified candidate and the score S of the candidate (hereinafter called word data) is generated, and is supplied to the agent processing unit 7. While the word data may include word information itself and a score S, it is advantageous that the word data includes a word ID and a score S for handing of data.

The natural language analyzer 3 classifies words representing word data (or text data) supplied from the speech recognition unit 2 for each part of speech by performing, for example, a process of morphological analysis on the word data, adds data indicating a classification result to the word data, then supplies the word data to the agent processing unit 7. A scheme for classification which is performed by the natural language analyzer 3 is arbitrary; for example, "ChaSen" which is a scheme developed by Nara Institute of Science and Technology, or the like may be used.

The non-volatile memory 42 of the speech synthesis processing unit 4 stores a speech segment database Dl which stores data representing waveforms of words, and a phoneme database D2 which stores data representing waveforms constituting phonemes.

The speech segment database DI stores data representing waveforms of words. The phoneme database D2 stores data representing waveforms constituting phonemes. The speech synthesis processing unit 4 generates digital speech data representing a speech reading out text data supplied from the agent processing unit 7 by using the data stored in the speech segment database DI and/or the phoneme database D2.

The speech synthesis processing unit 4 supplies the generated speech data to the speech output unit 5. The scheme of generating digital speech data is arbitrary; for example, slot filling method and rule-based synthesis (Rule-based synthesis) can be used. The slot filling method is a method by which, for example, word-by-word or segment-by-segment speeches are read by an announcer beforehand, and are linked together and output. A series of speeches read by an announcer may be separated words or segments in a later process, and stored, and they may be linked together and output. The rule-based synthesis is a method by which relatively small units, such as phonemes (consonants or vowels), kana, or phonemic parts of further segmented units, are linked together and output.

The speech output unit 5 reproduces a speech representing digital speech data supplied from the speech synthesis processing unit 4. More specifically, the speech output unit 5 has a D/A (Digital-to-Analog) converter 51, an AF amplifier 52, and a speaker 53 as shown in FIG. 2.

The D/A converter 51 performs DA conversion on digital speech data to convert the data to an analog speech signal. The AF amplifier 52 amplifies the analog speech signal. The speaker 53 vibrates according to the analog speech signal to reproduce and output a speech represented by the analog speech data.

The input/output target device group 6 comprises, for example, a navigation unit 61 and a clock 62.

The navigation unit 61 comprises a known navigation system which uses a mobile station of a GPS (Global Positioning System), a display device, such as a liquid crystal display, and a processor. The navigation unit 61 stores map information representing maps, generates data showing which position on a map a current position of a vehicle detected according to a control signal supplied by the agent processing unit 7 corresponds, and supplies the data together with map information representing a map around the current position to the agent processing unit 7.

The map around the current position is displayed together with a figure indicative of the current position.

The clock 62 comprises, for example, a crystal oscillator and a counter circuit, sequentially generates data indicative of a current time, and supplies the data to the agent processing unit 7. Time information which is acquired from the GPS may be supplied via the navigation unit 61.

The agent processing unit 7 has a communication controller 74 comprising a modem and a packet communication terminal, and connects to a distribution server 100 to be discussed later over an external network (e.g., the Internet via a wireless telephone circuit) via the communication controller.

The non-volatile memory 72 of the agent processing unit 7 stores the word database D3. The word database D3 is a database which stores data of a plurality of words and a category dictionary indicating under which concepts or categories the words are grouped.

The category dictionary has a data structure as shown in FIG. 3, for example. That is, the category dictionary stores data indicative of a word and data indicative of a category to which the word belongs, in association with each other. In the example shown in FIG. 3, for example, a word "hetta" (meaning hungry in Japanese) is associated with a category "eating". A single word may belong to a plurality of categories. (In the example shown in FIG. 3, for example, a word "onaka" (meaning stomach in Japanese) is associated with categories "eating" and "hospital".)

When a plurality of words are included in a single sentence, the agent device handles only a category to which the words commonly belong as a category to which the words belong, thereby allowing intention of the words uttered to be grasped according to the context. In the example shown in FIG. 3, for example, when a set of word data constructing a sentence "onaka ga hetta" (meaning that stomach is hungry in Japanese) is supplied to the agent processing unit 7 from the natural language analyzer 3, the agent processing unit 7 can handle only the category to which the words "onaka" (meaning stomach in Japanese) and "hetta" (meaning hungry in Japanese) commonly belong, i.e., only "eating", as a category to which the words "onaka" and "hetta" belong as far as the execution of the process concerning the sentence is concerned. Likewise, when a set of word data represents "want to go eating" uttered by a user, only the category "eating" to which the words "eating" and "want to go" commonly belong as a category to which the words "eating" and "want to go" belong as far as the execution of the process concerning the sentence "want to go eating" is concerned.

The agent processing unit 7 may use only that of word data supplied from the natural language analyzer 3 which represents a specific part of speech (e.g., only noun and verb) in a later process which the agent processing unit 7 performs.

A category to which a word belongs should not necessarily be specified by a combination of a plurality of words. Because a word "suita" (meaning hungry in Japanese) is associated only with the category "eating", for example, when word data representing the word "suita" is supplied, the agent processing unit 7 may handle the word data as belonging to the category "eating" without combining the word data with other words and performing a discrimination process.

The non-volatile memory of the agent processing unit 7 further stores a past experience database D, a Japanese food restaurant database D7, a Western food restaurant database D8 and a Chinese food restaurant database D9. The past experience database D6 is a database that stores the name of a restaurant whose position on a map is displayed on the navigation unit 61 or which is set as a goal by the agent processing unit 7. The Japanese food restaurant database D7, the Western food restaurant database D8 and the Chinese food restaurant database D9 are databases that store the names of Japanese food restaurants, the names of Western food restaurants, and the names of Chinese food restaurants, respectively.

The non-volatile memory of the agent processing unit 7 further stores the process item database D4 and a wire database D5.

The process item database D4 is a database storing data (process item data) which describes the contents of various processes to be executed by the agent processing unit 7, e.g., a trigger acquisition process (TGxx), a discrimination process (Cnxx or QBxx), and an input/output process (SPxx or EXxx to be discussed later), process item (pointer) by process item. Note that "xx" is an identification number.

Of the process items stored in the process item database D4, data describing the contents of the "trigger acquisition process (TGxx)" includes trigger data (data designating the contents of data to be acquired as a trigger) which specifies a trigger to start those processes and a transition constant for determining the progress direction to be discussed later (a constant which indicates the degree of transition constant in the progress direction and becomes a calculation standard for a weighting factor J to be described later). Trigger data is arbitrary, and is, for example, data indicating the current position of a vehicle supplied from the navigation unit 61, data indicating a current time supplied from the clock 62, or the aforementioned word data supplied from the natural language analyzer 3. Alternatively, trigger data may be data which is given from the process the agent processing unit 7 itself executes. When data acquired in a trigger acquisition process is word data, a category under which words represented by the word data are grouped may be described in place of the words represented by the word data. It is to be noted that the contents of the trigger acquisition process are described in such a way that a plurality of trigger acquisition processes are not performed based on word data representing the same word or word data belonging to the same category. Without such description, a plurality of operations are executed by given word data.

Figures 4A, 4B:
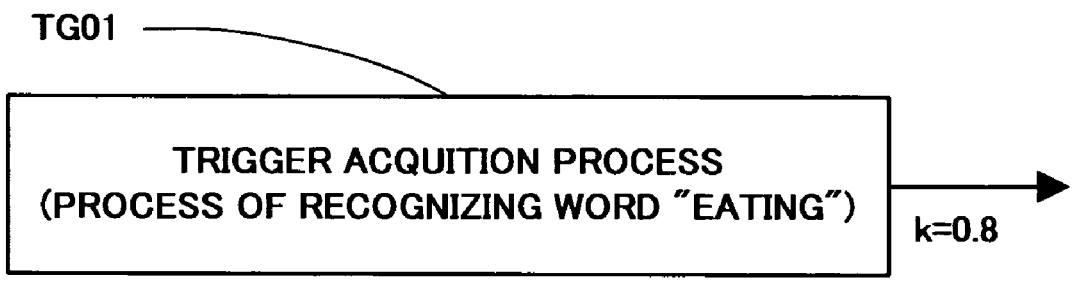
[FIG 4] A diagram for explaining a trigger acquisition process.

FIG. 4A shows an example of a trigger acquisition process TGxx. In this example, a trigger TG01 is a process of acquiring the category "eating" (identifying words grouped under the category "eating" (in the example shown in FIG. 3, words "hetta (meaning hungry in Japanese)", "suita (meaning hungry in Japanese)", "onaka (meaning stomach in Japanese", "eat", "go", "set", "someplace", "where", "eating") as a trigger, and the transition constant k for determining whether or not to proceed (transition) to a process following that process is 0.8. FIG. 4B illustrates a flowchart for a trigger acquisition process TG01.

A trigger acquisition process TG00 is a process of acquiring the word "not interesting".

A trigger acquisition process TG51 is a process of acquiring a word "Japanese food". A trigger acquisition process TG52 is a process of acquiring a word "Western food". A trigger acquisition process TG53 is a process of acquiring a word "Chinese food".

Data describing the contents of a "discrimination process (Cnxx)" stored in the process item database D4 includes a discrimination condition, a list of possible results as discrimination results, a transition constant k in a return direction to be discussed later, and data described for each discrimination process. Data describing the contents of a discrimination process includes a transition constant k for determining a progress direction, and data described for each discrimination result.

Figures 5A, 5B:
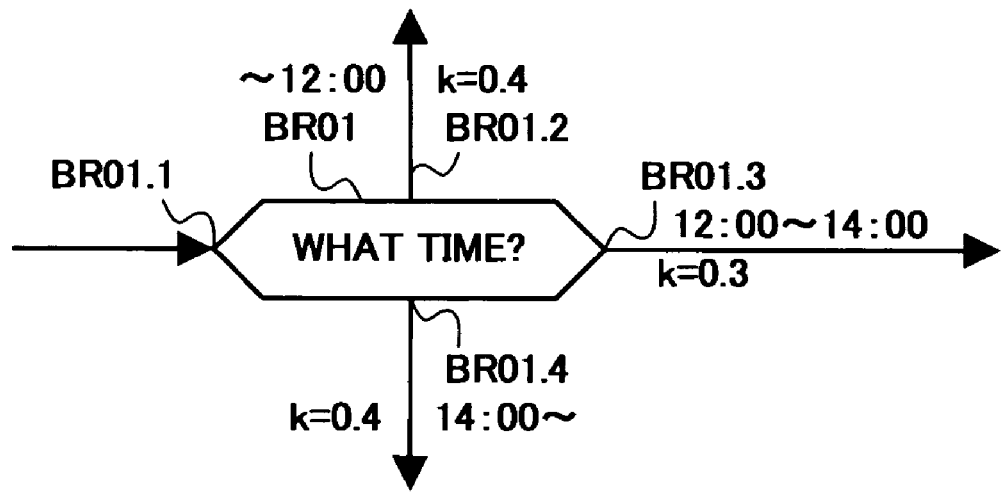
[FIG 5] A diagram for explaining a discrimination process.

FIG. 5A shows an example of a discrimination process BRxx. In this example, a discrimination process BR01 is "to discriminate which one of (a) before 12 o'clock, (b) 12 o'clock or later but before 14 o'clock, and (c) 14 o'clock or later it is". The transition constant k for determining whether or not to proceed to a subsequent process when it is discriminated as (a) before 12 o'clock is 0.4, the transition constant k for determining whether or not to proceed to a subsequent process when it is discriminated as (b) 12 o'clock or later but before 14 o'clock is 0.3, and the transition constant k for determining whether or not to proceed to a subsequent process when it is discriminated as (c) 14 o'clock or later is 0.4.

In the "discrimination process", data to be used in discrimination may be acquired from an arbitrary acquisition source. Possible acquisition sources include, for example, other processes to be executed by the speech recognition unit 2, the natural language analyzer 3 and the agent processing unit 7, devices belonging to the input/output target device group 6, and other external devices. In this case, data which describes the contents of the discrimination process may further include, for example, data specifying an acquisition source for data to be used in discrimination.

In the "discrimination process", predetermined data may be output to a predetermined output destination prior to discrimination (in which case, a symbol indicating the process is, for example, QBxx). For example, sending data representing a predetermined inquiry to the speech synthesis processing unit 4 prior to discrimination, or the like is possible. In case where predetermined data predetermined data is output in the discrimination process prior to discrimination, data which describes the contents of the discrimination process includes, for example, the contents of data to be output and data designating the output destination of the data.

Figures 6A, 6B:
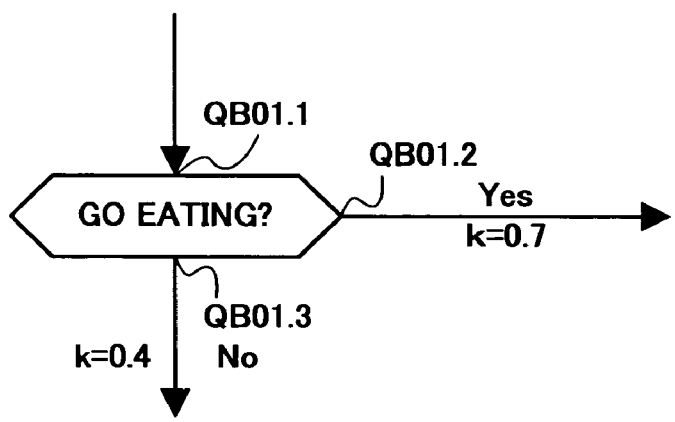
[FIG 6] A diagram for explaining a discrimination process with an inquiry.

FIG. 6A shows an example of a discrimination process QBxx. In this example, a discrimination process QB01, for example, asks a user "Go eating?", and the transition constant k in the progress direction when the response (the user's answer) is "Yes" is 0.7, and the transition constant k in the progress direction when the response is "No" is 0.4. FIG. 6B illustrates a flowchart for this example. A node QB01.1 shown in FIG. 6B is a start node indicating the start point of the process, a node QB01.2 is a node in the progress direction when it is discriminated that "go eating" is designated in response to the inquiry, and the transition constant k is 0.7. Further, a node QB01.3 is a node in the progress direction when it is discriminated that "don't go eating" is designated, and the transition constant k is 0.4. A discrimination process QB02 asks the user "Then, go to a convenience store?", the transition constant k in the progress direction when the response (the user's answer) is "Yes" is 0.5, and the transition constant k in the progress direction when the response is "No" is 0.3.

Data describing the contents of an "input/output process" stored in the process item database D4 comprises data which designates the contents of data to be input or output. Input data and output data may have arbitrary contents. For example, output data may be data representing reading of a speech which is generated by the speech output unit 5 via the speech synthesis processing unit 4 or a control signal which controls an external device. Input data may be, for example, data to be supplied from an external device.

Figures 7A, 7B:
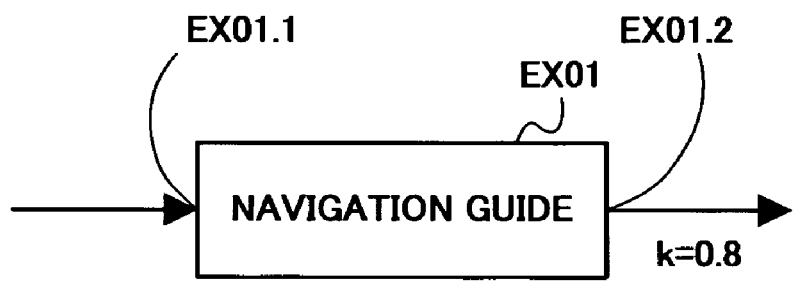
[FIG 7] A diagram for explaining an output process.

FIG. 7A shows an example of an input/output process EXxx. In this example, an output process EX02, for example, is an operation to "Do navigation guide", and the weighting factor k in the progress direction of executing a process after activation is 0.8. FIG. 7B illustrates a flowchart for this example. A node EXO1.1 shown in FIG. 7B is a start node indicating the start point of the process, a node EX01.2 is a node indicating the end of the process, and the weighting factor k is 0.8. With regard to the output process EXxx, selection of a node indicating the termination of a process may be made an essential process without performing setting of the transition constant k or the like.

The wire database D5 comprises a set of data describing transitions among a plurality of processes (TG, BRxx, QBxx, SPxx, EXxx) (the transition definition data will be hereinafter called wires). A wire comprises data described in, for example, a format illustrated in FIG. 8. As illustrated in the figure, wire Wn (W1, W2 . . . ) designates a preceding process (X), a following process (Y), and a weighting factor J given to transition, regarding the transition (From (X) To (Y)) from the preceding process X (From (X)) to the following process Y (To(Y)). When the preceding process X is a discrimination process, it is necessary to describe transition from what discrimination resultant of the discrimination process. Specifically, words "go", "yes" and "yea" which mean affirmative are defined for, for example, a single wire having a process item for discriminating a response to an inquiry based on speech data as a preceding process item, while words "don't go", "no" and the like which mean negative are defined for the other wires.

The transition constant k which the aforementioned process item data describes may be rewritten by the agent processing unit 7 or the like according to the achievement resulting from the execution of a transition indicated by wires to be connected. When the frequency of execution of a transition indicated by a specific wire is greater than a predetermined amount, for example, the agent processing unit 7 makes it likely to cause the transition indicated by the wire by rewriting the value of the transition constant k described in the process item data indicating a process item of a transition origin indicated by the wire to a value larger than before. This results in a higher probability of making a response intended by the user.

The agent processing unit 7 executes a flow represented by the process item database D4 and the wire database D5 as a whole. The process item database D4 and the wire database D5 can describe a flow illustrated in, for example, FIG. 9A.

Figure 9A:
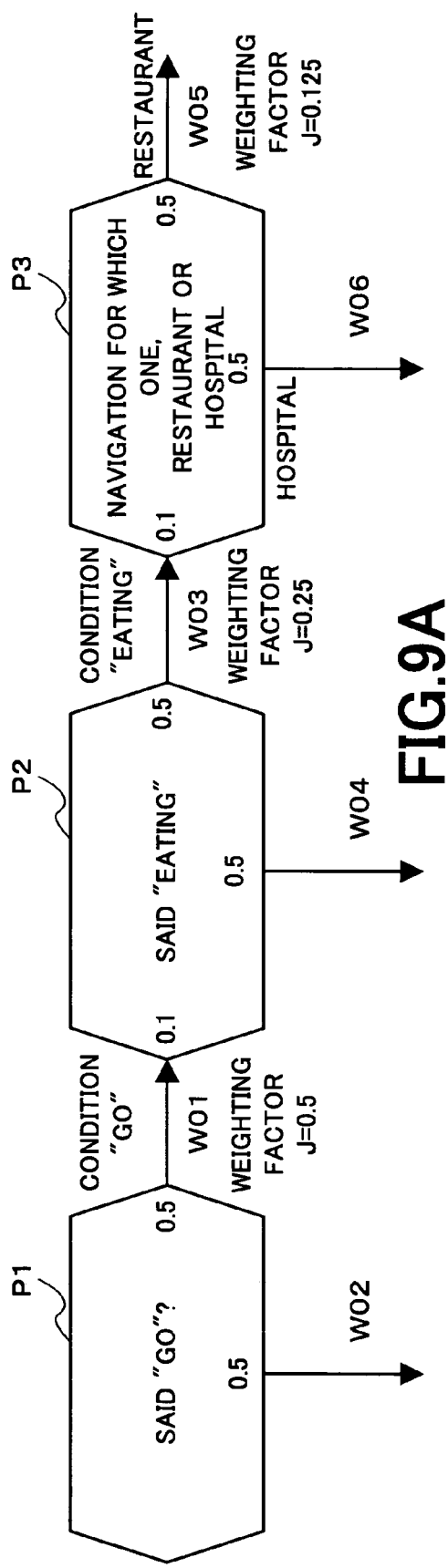
[FIG 9] A diagram showing a flow represented generally by a process item database and a wire database.

The following will describe in detail how to specifically perform the process of the agent processing unit 7 by referring to FIG. 9A. The agent processing unit 7 performs the following process when execution of a preceding first process P1 and transition to a following second process P2 are defined by a wire W01, and when execution of the second process P2 and transition to a following third process P3 are defined by a wire W03.

As illustrated, the process P1 is a process of discriminating whether or not word data representing the word "go" is supplied, the process P2 is a process of discriminating whether or not word data representing the word "eating" is supplied, and the process P3 is a process of discriminating whether or not information indicating which position of a restaurant or a hospital is to be acquired from the navigation unit 61. It is assumed that, as illustrated, the transition constant k in each progress direction is 0.5 for any of the processes P1 to P3. In this case, wires are defined as shown in FIG. 9B. It is assumed that, the agent processing unit 7 acquires only that word data in word data supplied to the natural language analyzer 3 from the speech recognition unit 2 which represent words are classified as a noun or a verb in the natural language analyzer 3.

First, when the agent processing unit 7 reaches the first process PI, the agent processing unit 7 calculates weighting factors J of the wires W01, W03 and W05, and writes calculation results to the wires W01, W03 and W05. Those values are determined by the transition constant k preset in each process.

Specifically, when the process reaches the process P1, the weighting factor J of the wire W01 becomes the value of the transition constant k associated with the wire of the process P1 or 0.5.

The weighting factor J of the wire W03 of the process P2 becomes the result of multiplying the transition constant k=0.5 associated with the wire W01 of the process P1 by the transition constant k=0.5 associated with the wire W03 of the process P3, or 0.25.

The weighting factor J of the wire W05 becomes the result of further multiplying the result of multiplication of the transition constant k=0.5 associated with the wire W01 of the process P1 by the transition constant k=0.5 associated with the wire W03 of the process P2 by the transition constant k=0.5 associated with the wire W05 of the process P3, or 0.125.

The weighting factor J of each wire with a given process being a base point is calculated this way. Every time the current state is transitioned, therefore, the weighting factor J is calculated with the current process being a base point.

Specifically, when the current state is transitioned to the process P2, the weighting factor J of the wire W03 becomes a value of 0.5 equal to the transition constant k associated with the wire W03 of the process P2, the weighting factor J of the wire W05 becomes the product the transition constant k =0.5 associated with the wire W03 of the process P2 and the product the transition constant k =0.5 associated with the wire W05 of the process P3, i.e., 0.25. At this time, the agent processing unit 7 writes the weighting factor J of the wire W01 associated with the opposite direction or the direction to return to the process P1 again. In a case of transition to the process P2, the transition constant k=0.1 in the return direction associated with the wire W01 directly becomes the weighting factor J of the wire W01. In a case of transition to the process P3, further, the transition constant k=0.1 in the return direction associated with the wire W03 directly becomes the weighting factor J of the wire W03. The weighting factor J of the wire W01 in the state transitioned to the process P3 becomes a value of multiplying the transition constant k=0.1 of the wire W03 in the state transitioned to the process P3 by the transition constant k=0.1 in the return direction of the process P2, i.e., 0.01.

Figure 9C:
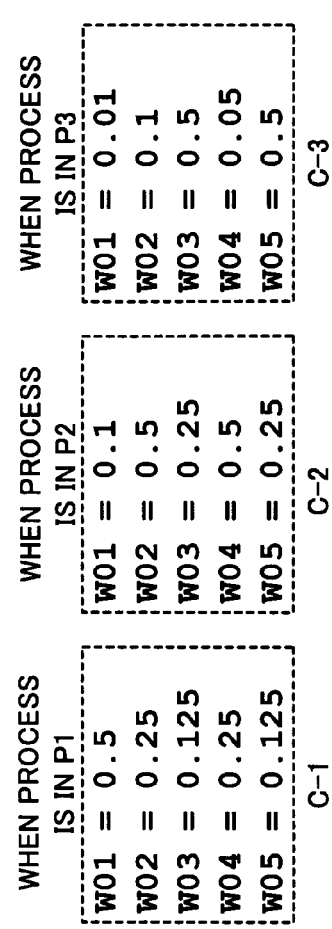
Figure 9B:
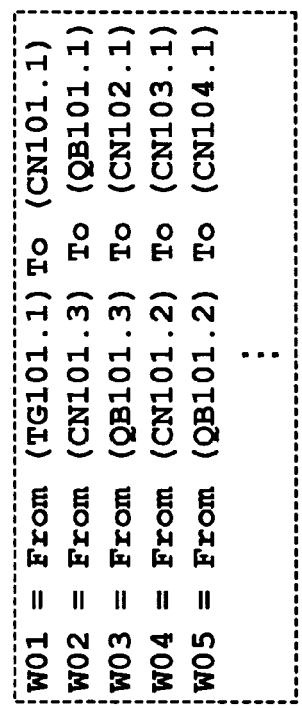

Changes of the weighting factor J of each wire Wn are shown in FIG. 9C.

Calculation of the weighting factor J is set for all the wires of every flow, not only for the processes of a relating flow. Predetermined small calculated values have only to be assigned to wires which are not relevant to a present process. For a wire which has a trigger acquisition process as a preceding process, particularly, the weighting factor J is set high to some extent. This can ensure jumping to a conversation different in content from a conversation that has been made immediately before.

A condition is set to each wire. Specifically, the word "go" is set as a condition to W01, and the word "eating" is set as a condition to W03. In a case where word data is supplied from the natural language analyzer 3, a score indicated by the word data is set to W01 when the word data indicates the word "go". When the word data supplied from the natural language analyzer 3 indicates the word "eating", a score indicated by the word data is set to W03. A plurality of different words may be set to each wire as conditions. For instance, the words "eating" and "food" which mean "eating" are assigned as conditions to one wire, and the words "go" and the like which mean "go" are assigned as conditions thereto. When the word data supplied from the natural language analyzer 3 is the word "eating" and the word "go", their scores S are set to the wire. Based on the set scores S, the calculation result for the wire is acquired. In this case, the scores S may be added, or an average may be acquired.

Further, conditions to be set to each wire are not limited to a case where a single word is set for one meaning. For instance, a plurality of different words representing the same meaning may be set as conditions. For this condition setting, it is sufficient that the relationship between the words and the wire is stored and words whose scores S are to be calculated are stored in the word database D3.

For example, for an input speech, the speech recognition unit 2 calculates the score S of every word registered in the word database D3, generates word data associated with at least words whose scores acquired are equal to or greater than a predetermined score, and outputs the word data to the agent processing unit 7 via the natural language analyzer 3. Next, the agent processing unit 7 discriminates with which wire the each input word data is associated, and sets the score S indicated by the word data to each associated wire. In this manner, even when same word is set as a condition to a plurality of wires, it is sufficient to perform the calculation of the score S of the input speech signal and a word once. Then, the score S of each word acquired is set to the respective wire S associated. While there occurs a case where a plurality of scores S are obtained for a single wire S, the score S with the highest value, for example, should be selected in this case.

Accordingly, if word data indicating the same meaning, such as "yes", "yeah" and "yea", is set to a single wire, it is possible to acquire an adequate result as the score S of speech recognition even when the user utters a voice instruction in any one of "yes", "yeah" and "yea".

Depending on a discrimination process, information from the input/output target device group 6 is acquired as input information. In this case, the processor 21 constituting the speech recognition unit 2, for example, may store data indicative of the status of each device relating to the input/output target device group 6 in the aforementioned non-volatile memory or the like as a status database (similar to the aforementioned "word database D3", for example), which state of which device the input information indicates may be determined by referring to the status database, and the data and the score S may be supplied as status data to the agent processing unit 7. Unlike in the case of speech recognition, the score S should always be set to 100% when a corresponding status is present in the status database. The agent processing unit 7 has only to discriminate wires associated with the status indicative of the status data and set the score S to each wire.

Figure 10:
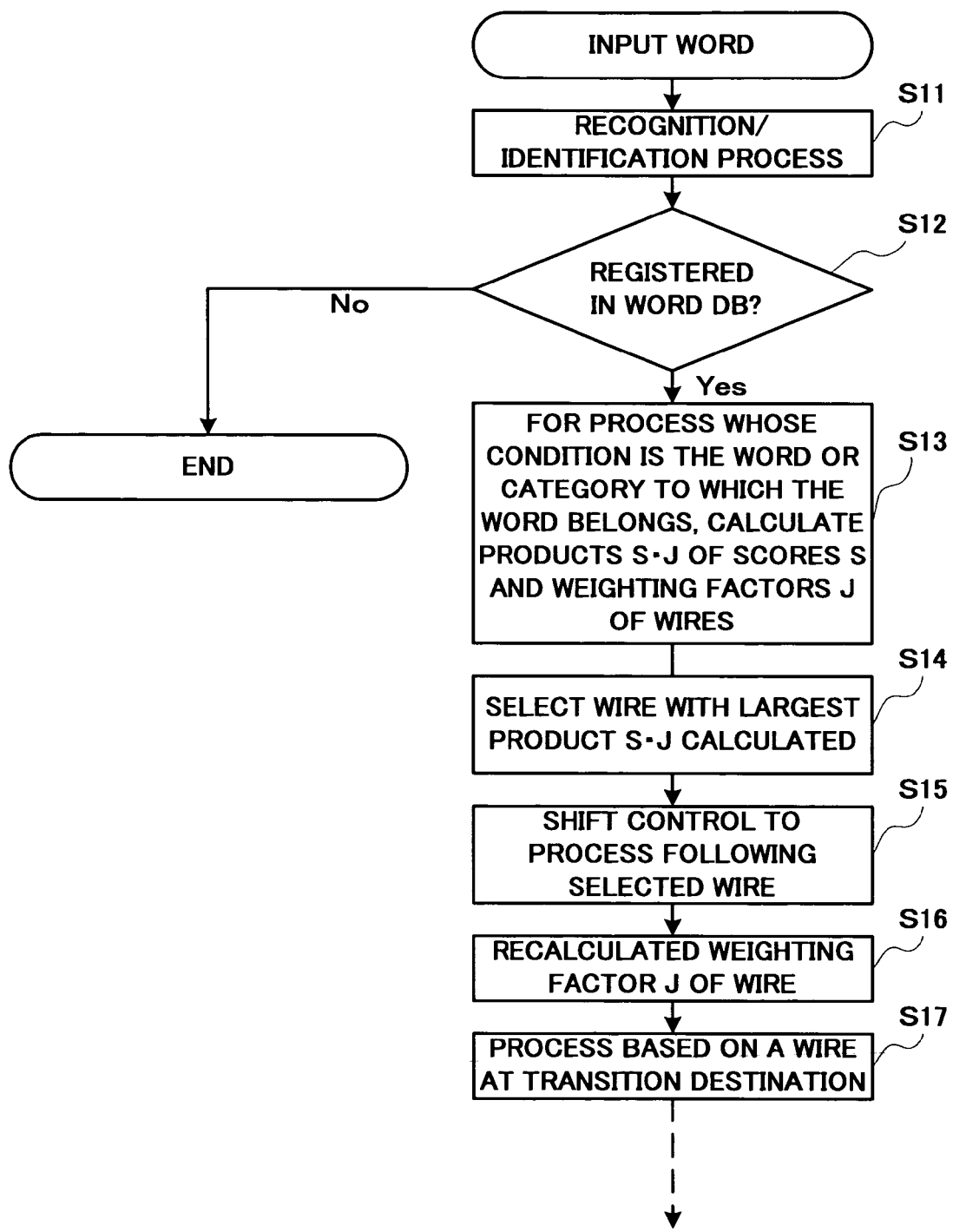
[FIG 10] A flowchart for explaining setting of a weighting factor.
Figure 11:
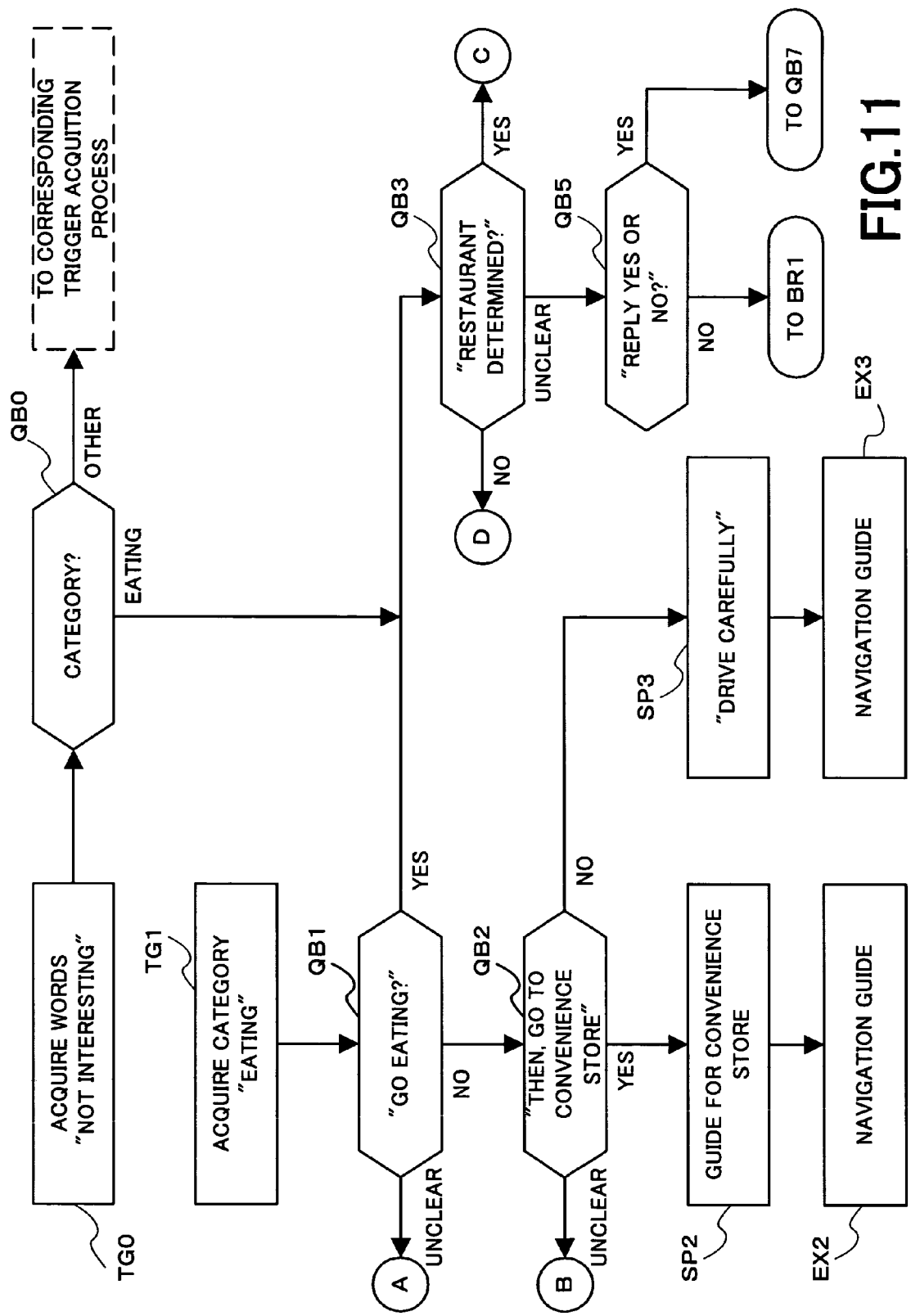
[FIG 11] A flowchart illustrating a process which is performed to guide a passenger to a place of eating.
Figure 12:
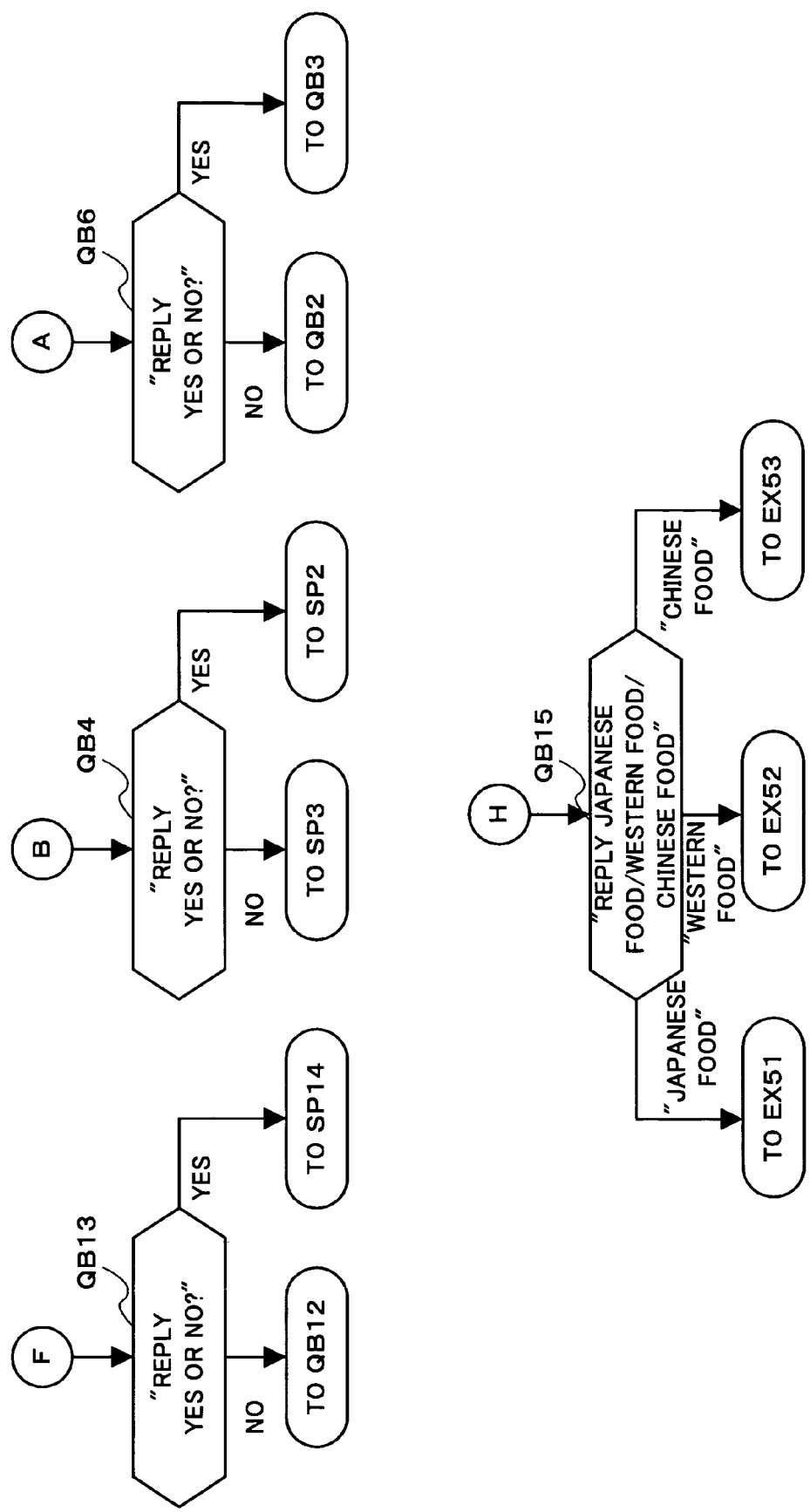
[FIG 12] A continuation of the flowchart illustrating the process which is performed to guide a passenger to a place of eating.
Figure 13:
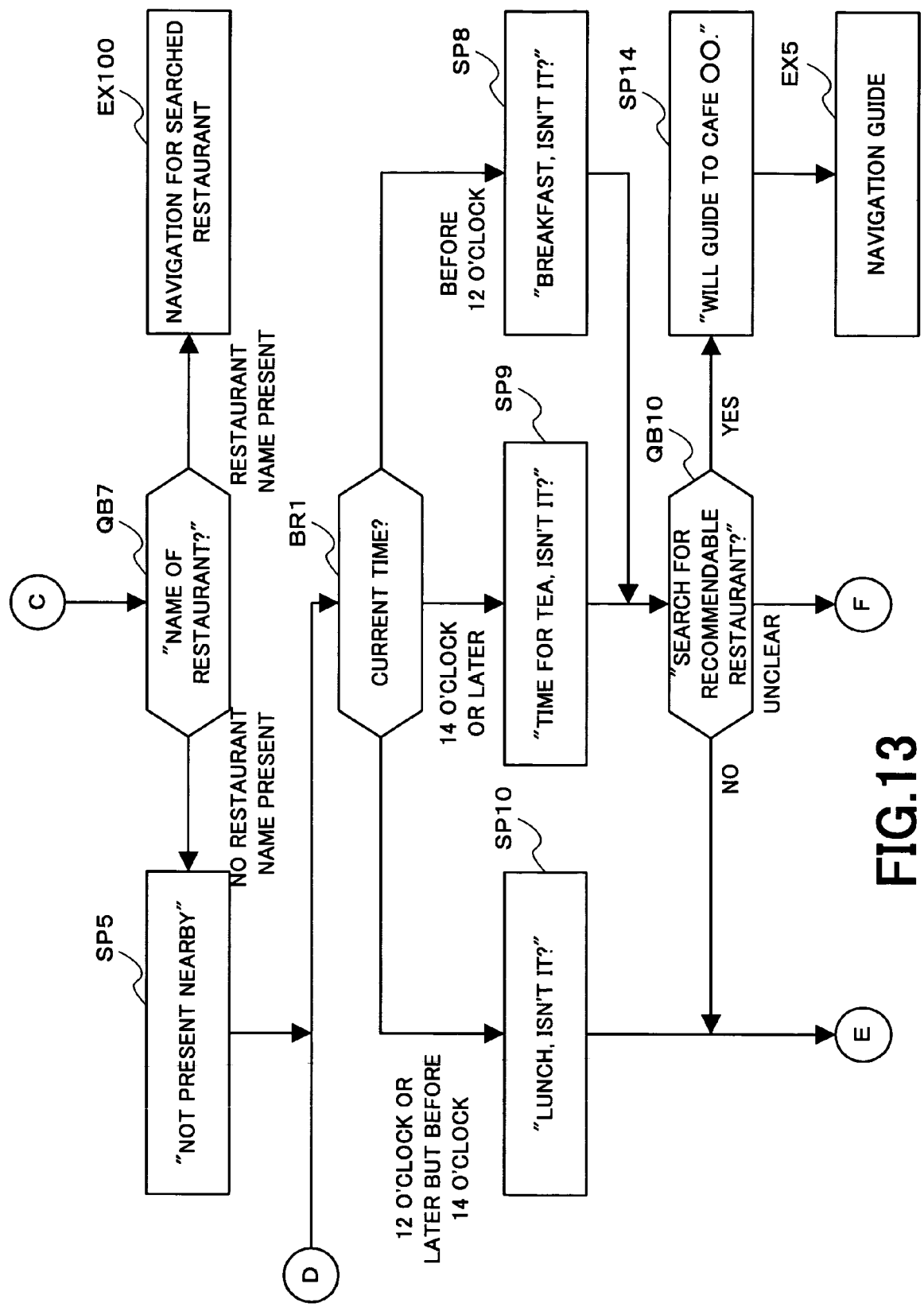
[FIG 13] A continuation of the flowchart illustrating the process which is performed to guide a passenger to a place of eating.
Figure 14:
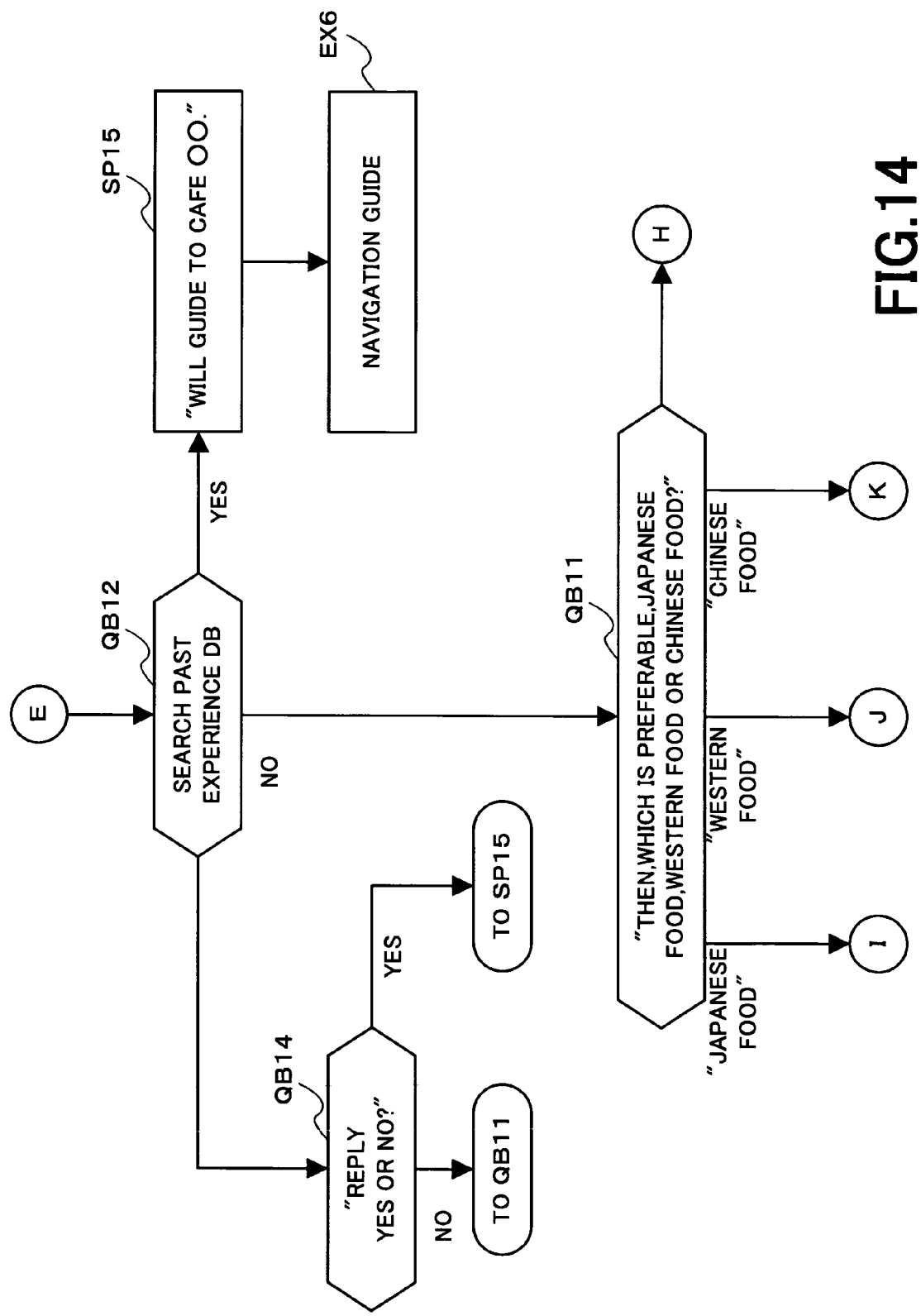
[FIG 14] A continuation of the flowchart illustrating the process which is performed to guide a passenger to a place of eating.
Figure 15:
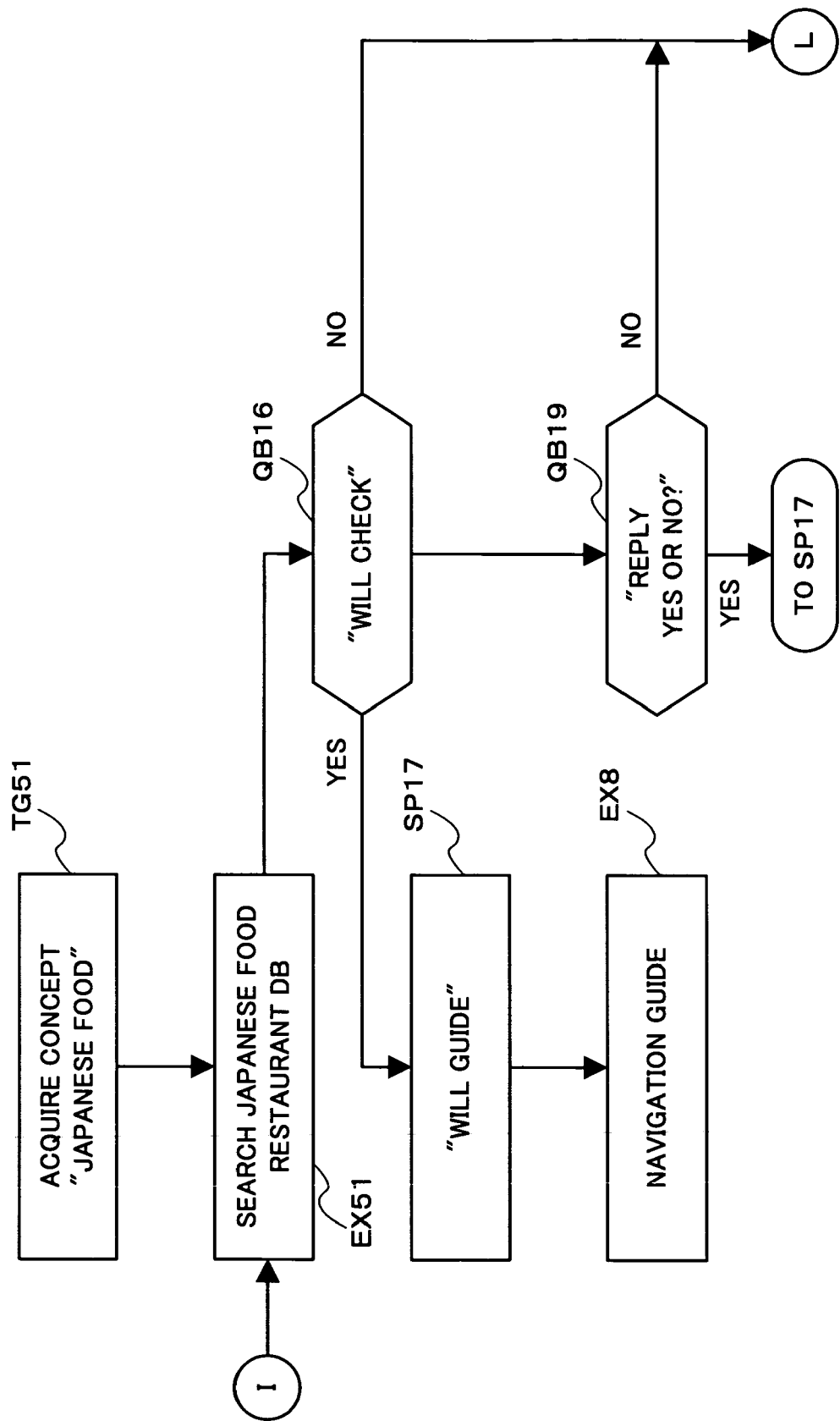
[FIG 15] A continuation of the flowchart illustrating the process which is performed to guide a passenger to a place of eating.
Figure 16:
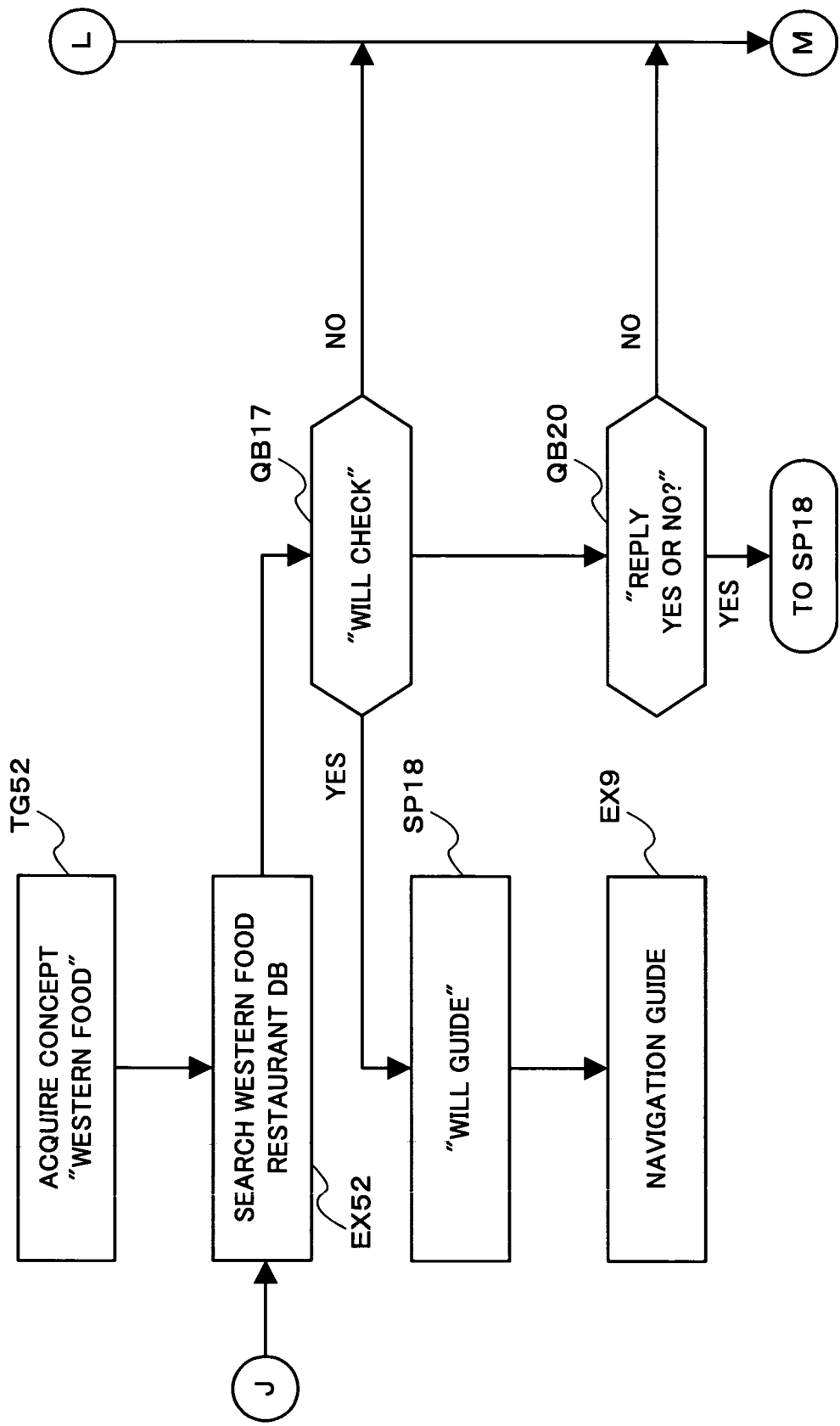
[FIG 16] A continuation of the flowchart illustrating the process which is performed to guide a passenger to a place of eating.
Figure 17:
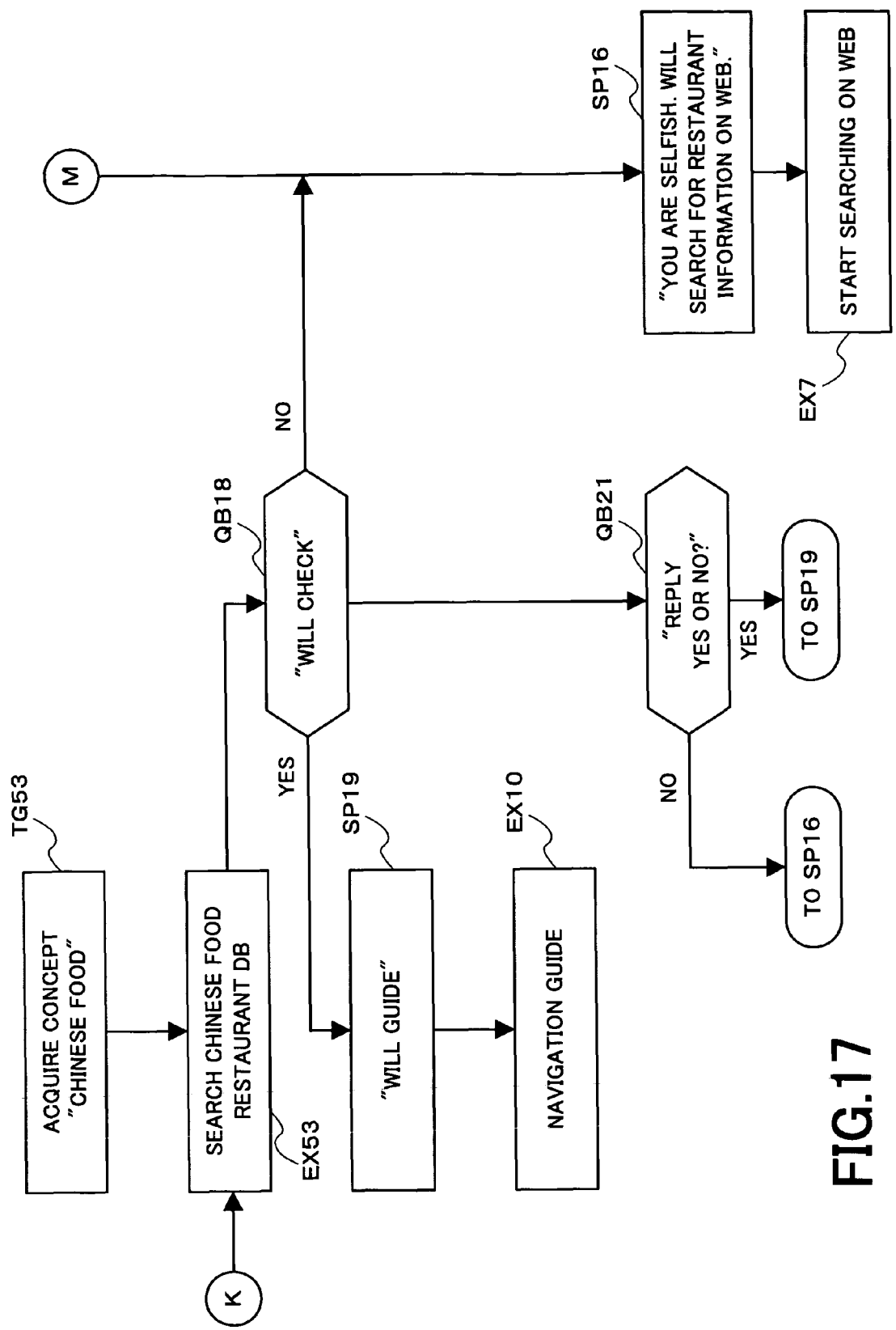
[FIG 17] A continuation of the flowchart illustrating the process which is performed to guide a passenger to a place of eating.

Next, the operation of the entire system structured in this manner will be explained with reference to FIG. 10. The speech input unit 1, the speech recognition unit 2 and the natural language analyzer 3 individually operate, capture a speech, analyze it, and supply word data to the agent processing unit 7.

When (one or plural) word data (or status data) regarding discrimination conditions are supplied from the natural language analyzer 3 or the like, the agent processing unit 7 executes the following processes.

a supplied word is recognized (identified) (step S11), and it is discriminated whether or not the data corresponds to a word registered in the word database D4 (step S12). If it is not registered (step S12, No), a word inputting process is finished.

If it is registered (step S12, Yes), a product S·J of the likelihood (score) S of the word and the weighting factor J of the wire is calculated with respect to a process whose condition is the "category" to which the word belongs (step S13).

For example, suppose that the process pointer PP indicates the first process in a case where the flow illustrated in FIG. 9A is being executed. The weighting factors J of the individual wires in this case are as illustrated in FIG. 9C.

In this state, suppose that word data indicating the word "go" with a score of 80% and the word "eating" with a score of 50% is input.

In the example illustrated in FIG. 9A and 9B, the word "go" relates to the discrimination condition in the first process P1, and the word "eating" relates to the discrimination condition in the third process P3.

As illustrated in FIG. 9(c-1), the weighting factor J of the wire W01 whose preceding process is a process of inputting the word data indicating the word "go" is 0.5, and the weighting factor J of the wire W03 whose preceding process is a process of inputting the word data indicating the word "eating" is 0.25. In this case, the products S·J of the likelihoods S acquired for the wires W01 and W03 and the weighting factors J are as indicated by equations 1 and 2.

$$\text{Product } J \cdot S \text{ of likelihood } S \text{ and weighting factor } J \text{ of wire W51: score } S(=80\%) \text{ for "go"} \times \text{weighting factor } J(=0.5) \text{ of wire W01} = 40 \quad \text{(Equation 1)}$$

$$\text{Product } J \cdot S \text{ of likelihood } S \text{ and weighting factor } J \text{ of wire W53: score } S(=50\%) \text{ for "eating"} \times \text{weighting factor } J(=0.25) \text{ of wire W03} = 12.5 \quad \text{(Equation 2)}$$

The agent processing unit 7 performs the above-described processes of acquiring the product S·J of the score S and the weighting factor J for every wire of the flow.

Subsequently, the agent processing unit 7 selects wire with the largest product S·J calculated (step S14 in FIG. 10). The agent processing unit 7 shifts control to a process following the selected wire (step S15). When the product S·J acquired for the wire W01 represents the largest value, for example, the input data is recognized as representing the word "go", and transition takes place to the second process P2 which is the process following the wire W01. Normally, with a process currently in execution being taken as a starting point, the weighting factor J of the wire is relatively large. Accordingly, the process generally shifts to the next process, but in a case where a word which quite differs from a previous one and has a large likelihood is input, a process corresponding to that word may start. When the score S for "go" is 30% and the score S for "eating" is 80% in the above-described example, for example, the respective products S·J become 15 and 20, in which case the wire W03 is selected. This is particularly effective when the user of the agent device knows the flow of processes, skips the current process and jumps to a nearby process.

When the process transitions, the agent processing unit 7 recalculates the weighting factors J of the individual wires based on the status after transition (step S16).

Thereafter, the process is carried out in accordance with the contents of the process (step S17).

A somewhat large weighting factor may be set for transition from a trigger acquisition process. Specifically, provided that the trigger acquisition process of acquiring word data indicating the word "go" precedes the process P1, a weighting factor J=1.0 is given to, for example, the wires that define transition from the trigger acquisition process to the process P1. Then, in a case where the process of the agent processing unit 7 belongs to the flow associated with the trigger acquisition process, for example, as the user pronounces "go eating" and word data whose score S for the word "go", for example, is 80% is obtained, the product S·J of the score S and the weighting factor J of the wire associated with "determination of whether or not the user have said "go"" is 80%×1.0, i.e., 80. If the value is larger than the discrimination results for the other wires, an input speech is recognized as "go", and the process of the agent processing unit 7 jumps to the process P1. If the weighting factors J of the other wires are set extremely small, the probability of jumping to processes defined by the other wires becomes extremely low, resulting in that the recognition rate can be improved along the flow of a conversation expected to some extent.

In the embodiment, transition in the reverse direction may occur. However, it is often undesirable to reverse a conversation in practice. Accordingly, a reverse-direction transition constant k should be set to a smaller value than a preceding-direction transition constant k. Then, even if word data with a high score S is obtained from an input speech, a product S·J acquired for that wire to which the transition constant k in the return direction is written as the weighting factor J becomes a small value, so that the possibility of transition in the return direction can be suppressed low.

The agent processing unit 7 may treat a process in which the value of the acquired product S·J does not meet a predetermined condition (a process in which the value of the product S·J does not reach a predetermined value) in such a way that the process is excluded from transition execution targets.

As illustrated in, for example, FIG. 8, a wire defines transition in the form of transition from a process item to a process item. As a wire is described in the form as illustrated in FIG. 8 and stored in the wire database, it is possible to define relationships among the individual process items as if they were macro processes of a computer. This can facilitate connection of the individual process items.

Because a process item to be a trigger actually becomes calculation of a discrimination result based on the score S of a word or the like (which may be another state for the input/output target device group 6) as a condition associated with a wire to be connected and the weighting factor J, a trigger acquisition process item in the definition of the wire is not defined as the starting point of the wire, but the wire itself is defined as the origin of transition.

Further, as the connection relationships among the individual process items are defined by wires, wires can be added easily. In a case where the user frequently inputs a speech "find a family restaurant" with an intention to take a rest after a speech "hot", for example, is input, a wire is automatically added with respect to the search process item of a family restaurant. Then, after the wire is automatically added, it becomes possible to appropriately cope with the input "find a family restaurant" by increasing the weighting factor J of a wire connected to a family restaurant search process item to some extent. (In this case, however, the agent processing unit 7 shall store map data or the like including, for example, information representing the location of a family restaurant, or access external map data or the like.) The automatic addition of a wire may be automatically carried out when the number of jumps from one process item to another process item (or wire) is counted and reaches a predetermined number.

Next, a process which the agent device executes to guide a passenger who is a user to the place of eating will be explained referring to FIG. 11 to FIG. 17. Hereinbelow, the process item database and the wire database generally describe flows shown in FIGS. 11 to 17.

In the flows shown in FIGS. 11 to 17, when word data indicating a word belonging to the category "eating" is supplied from the natural language analyzer 3 in the trigger acquisition process TG1, the agent processing unit 7 acquires and gives it to a discrimination process step QB1. As a word to be acquired in the trigger acquisition process TG1 can be any word classified to the category "eating", the agent device executes a process following the discrimination process step QB1 in response to various words if arbitrary words, such as "meal" and "food", are classified to the category "eating" in the category dictionary.

In the discrimination process step QB1, the agent processing unit 7 first supplies word data representing a sentence "Go eating?" to the speech synthesis processing unit 4. The speech synthesis processing unit 4 generates speech data representing a speech which reads out the sentence, and supplies the data to the speech output unit 5 which reproduces the speech represented by the speech data. Then, the agent processing unit 7 stands by for word data belonging to the category "affirmation" or "negation" from the natural language analyzer 3, and discriminates which of "affirmation" and "negation" the corresponding word data belongs when the word data is supplied. When it is discriminated that the data belongs to "affirmation", the process is shifted to a discrimination process step QB3, and when it is discriminated that the data belongs to "negation", the process is shifted to a discrimination process step QB2.

A word which means affirmation, such as "yes" or "yeah" may be set as a condition to each wire, e.g., a wire which defines a status transition from QB1 to QB3, not to a category-based process, and a word which means negation, such as "no" or "don't go" may be set as a condition to a wire which defines a status transition from QB1 to QB2. Accordingly, the natural language analyzer 3 automatically sets the score S of the word corresponding to the input speech to a wire. When the score S for the word "yeah" of the input speech is 80%, for example, the score S is set to the wire which defines the status transition from QB1 to QB3.

Then, the calculation result for the wire is acquired by multiplication of the acquired score S and the weighting factor J set to the wire, and the status is shifted to the wire whose calculation result shows the highest value as in the case of classifying individual words to the category.

When no word data of a word belonging to either the category "affirmation" or the category "negation" is supplied, word data representing a sentence "Reply either yes or no?" is supplied to the speech synthesis processing unit 4. The speech synthesis processing unit 4 generates speech data representing a speech which reads out the sentence, and supplies the speech data to the speech output unit 5, causing the speech output unit 5 to reproduce the speech represented by the speech data. Then, it stands by for word data belonging to the category "affirmation" or "negation" to be supplied, and when word data belonging to either category is supplied, the process is shifted to one of the individual transition destinations in the discrimination process step QB1 according to the category of that word data (discrimination process step QB6).

Alternatively, when word data indicating the word "not interesting" is supplied from the natural language analyzer 3 in the trigger acquisition process TG0, the agent processing unit 7 acquires and gives the data to the discrimination process step QB0. In the discrimination process step QB0, it is discriminated to which category the word "not interesting" is treated as belonging as a consequence of overlapping of other words in the belonging category. When it is discriminated that the data belongs to another category, the process continues, considering that the word data has been acquired in the trigger acquisition process for acquiring a word belonging to that category.

In the discrimination process step QB2, the agent processing unit 7 first causes the speech output unit 5 to reproduce a speech which reads out a sentence "Then, go to a convenience store?" via the speech synthesis processing unit 4 as done in the discrimination process step QB1. Then, it stands by for word data belonging to the category "affirmation" or "negation" from the natural language analyzer 3, and discriminates to which of "affirmation" and "negation" the corresponding word data belongs when the word data is supplied. When it is discriminated that the data belongs to "affirmation", the process is shifted to an input/output process step SP2, and when it is discriminated that the data belongs to "negation", the process is shifted to an input/output process step SP3. When word data of none of the words belonging to either one of the categories is supplied, it causes the speech output unit 5 to reproduce a speech which reads out a sentence "Reply either yes or no?", stands by for word data belonging to the category "affirmation" or "negation" to be supplied, and shifts the process to one of the individual transition destinations in the discrimination process step QB2 according to the category of the supplied word data (discrimination process step QB4).

In the input/output process step SP2, the agent processing unit 7 causes the speech output unit 5 to reproduce a speech which reads out a sentence "Will guide a convenience store." via the speech synthesis processing unit 4, and shifts the process to an input/output process step EX2. In the input/output process step EX2, a control signal instructing to display information indicative of the current position of the vehicle having the agent device mounted thereon on a map and the position of the convenience store on the map is sent to the navigation unit 61. In accordance with the instruction, the navigation unit 61 displays information indicative of the current position of the vehicle on the map and the position of the convenience store on the map, and starts giving a guide for the convenience store.

In the input/output process step SP3, the agent processing unit 7 causes the speech output unit 5 to reproduce a speech which reads out a sentence "Drive carefully" via the speech synthesis processing unit 4, and shifts the process to an input/output process step EX3. In the input/output process step EX3, a control signal is sent to the navigation unit 61 to cause the navigation unit 61 to display the current position of the vehicle on the map.

In the discrimination process step QB3, the agent processing unit 7 causes the speech output unit 5 to read out a sentence "A restaurant determined?", stands by for word data belonging to the category "affirmation" or "negation", and discriminates to which category the corresponding word data belongs when the word data is supplied. When it is discriminated that the data belongs to "affirmation", the process is shifted to a discrimination process step QB7, and when it is discriminated that the data belongs to "negation", the process is shifted to a discrimination process step BR1. When word data of none of the words belonging to either one of the categories is supplied, it causes the speech output unit 5 to reproduce a speech which reads out a sentence "Reply either yes or no?", stands by for word data belonging to the category "affirmation" or "negation" to be supplied, and shifts the process to one of the individual transition destinations in the discrimination process step QB2 according to the category of the supplied word data.

In the discrimination process step QB7, the agent processing unit 7 causes the speech output unit 5 to read out a sentence "Name of the restaurant?" via the speech synthesis processing unit 4, stands by for word data, searches for the restaurant indicated by the word data when supplied, sends a control signal instructing to display information indicative of the current position of the vehicle on the map and the position of the restaurant on the map to the navigation unit 61 when there is the restaurant of interest. When there is the restaurant of interest, the navigation unit 61 displays information indicative of the current position of the vehicle on the map and the position of the restaurant on the map, and starts guiding for the restaurant (step EX100). When there is no restaurant of interest, on the other hand, the navigation unit 61 returns information to that effect to the agent processing unit 7, and the agent processing unit 7 shifts the process to an input/output process step SP5. In the input/output process step SP5, the agent processing unit 7 causes the speech output unit 5 to read out a sentence "Not present nearby.", and shifts the process to the discrimination process step BR1.

In the discrimination process step BR1, the agent processing unit 7 acquires data indicating the current time from the clock 62, and discriminates which one of (a) before 12 o'clock, (b) 12 o'clock or later but before 14 o'clock, and (c) 14 o'clock or later the time indicated by the data is. When it is discriminated as (a) before 12 o'clock, the speech output unit 5 is caused to read out a sentence "Breakfast, isn't it?" (input/output process step SP8), and the process is shifted to a discrimination process step QB10. When it is discriminated as (b) 12 o'clock or later but before 14 o'clock, the speech output unit 5 is caused to read out a sentence "Lunch, isn't it?" (input/output process step SP10), and the process is shifted to a discrimination process step QB12. When it is discriminated as (c) 14 o'clock or later, the speech output unit 5 is caused to read out a sentence "Time for tea, isn't it?" (input/output process step SP9), and the process is shifted to a discrimination process step QB10.

In the discrimination process step QB10, the agent processing unit 7 causes the speech output unit 5 to read out a sentence "Search for recommendable restaurants?", stands by for word data belonging to the category "affirmation" or "negation", and discriminates to which category the corresponding word data belongs when the word data is supplied. When it is discriminated that the data belongs to "affirmation", the process is shifted to an input/output process step SP14, and when it is discriminated that the data belongs to "negation", the process is shifted to the discrimination process step QB12. When word data of none of the words belonging to either one of the categories is supplied, it causes the speech output unit 5 to reproduce a speech which reads out a sentence "Reply either yes or no?", stands by for word data belonging to the category "affirmation" or "negation" to be supplied, and shifts the process to one of the individual transition destinations in the discrimination process step QB10 according to the category of the supplied word data (discrimination process step QB13).

In the input/output process step SP14, the agent processing unit 7 searches for a restaurant nearby the current position of the vehicle, supplies data indicating the name of the searched restaurant to the navigation unit 61 and sends a control signal instructing to display information indicating the current position of the vehicle on the map and the position of the restaurant on the map to the navigation unit 61. When the navigation unit 61 supplies the instruction, the agent processing unit 7 causes the speech output unit 5 to read out the name of the restaurant. Meanwhile, the navigation unit 61 displays information indicative of the current position of the vehicle on the map and the position of the restaurant on the map, and starts giving a guide for the restaurant (step EX5).

In the discrimination process step QB12, the agent processing unit 7 causes the speech output unit 5 to read out a sentence "Search the past experience DB (database)?", stands by for word data belonging to the category "affirmation" or "negation", and discriminates to which category the corresponding word data belongs when the word data is supplied. When it is discriminated that the data belongs to "affirmation", the process is shifted to an input/output process step SP15, and when it is discriminated that the data belongs to "negation", the process is shifted to a discrimination process step QB11. When word data of none of the words belonging to either one of the categories is supplied, it causes the speech output unit 5 to reproduce a speech which reads out a sentence "Reply either yes or no?", stands by for word data belonging to the category "affirmation" or "negation" to be supplied, and shifts the process to one of the individual transition destinations in the discrimination process step QB12 according to the category of the supplied word data (discrimination process step QB14).

In the input/output process step SP15, the agent processing unit 7 searches the past experience database with, for example, the current position of the vehicle indicated by the information supplied by the navigation unit 61 being a search key, and causes the speech output unit 5 to read out the name of the searched restaurant. The agent processing unit 7 sends a control signal instructing to display information indicating the current position of the vehicle on the map and the position of the searched restaurant on the map to the navigation unit 61. The navigation unit 61 displays information indicative of the current position of the vehicle on the map and the position of the restaurant on the map, and starts giving a guide for the restaurant (step EX6).

In the discrimination process step QB11, the agent processing unit 7 causes the speech output unit 5 to read out a sentence "Then, which is preferable, Japanese food, Western food or Chinese food?", stands by for word data representing words "Japanese food", "Western food" or "Chinese food" to be supplied, and discriminates which words the word data, when supplied, represents. When it is discriminated that the data is "Japanese food", the process is shifted to an input/output process step EX51, when it is discriminated that the data is "Western food", the process is shifted to an input/output process step EX52, and when it is discriminated that the data is "Chinese food", the process is shifted to an input/output process step EX53. When word data of none of the words is supplied, it causes the speech output unit 5 to reproduce a speech which reads out a sentence "Reply Japanese food, Western food or Chinese food", stands by for word data representing words "Japanese food", "Western food" or "Chinese food", and shifts the process to one of the individual transition destinations in the discrimination process step QB11 according to the category of the supplied word data (discrimination process step QB15).

In the input/output process step EX51, the agent processing unit 7 searches the Japanese food restaurant database with, for example, the current position of the vehicle indicated by the information supplied by the navigation unit 61 being a search key, and shifts the process to a discrimination process step QB16. When acquiring word data representing the words "Japanese food" in a trigger acquisition process TG51, the agent processing unit 7 also shifts the process to the input/output process step EX51.

The Japanese food restaurant database is searched in the input/output process step EX52, and the Chinese food restaurant database is searched in the input/output process step EX53 as done in the input/output process step EX51, and the process is shifted to the discrimination process step QB17 or QB18 as illustrated. Note that the agent processing unit 7 also shifts the process to the input/output process step EX52 when acquiring word data representing the words "Western food" in the trigger acquisition process TG52. Note that the process is also shifted to the input/output process step EX53 when acquiring word data representing the words "Chinese food" in the trigger acquisition process TG53.

In the discrimination process step QB16, QB17 or QB18, the agent processing unit 7 causes the speech output unit 5 to read out the name of the restaurant searched in the input/output process step EX5 1, EX52 or EX53 and a sentence asking for confirmation, and stands by for word data belonging to the category "affirmation" or "negation". When the corresponding word data is supplied, it is discriminated to which category the word data belongs. When it is discriminated that the data belongs to "affirmation", the process is shifted to an input/output process step SP17, SP18 or SP19, and when it is discriminated that the data belongs to "negation", the process is shifted to an input/output process step SP16. When word data of none of the words belonging to either one of the categories is supplied, it causes the speech output unit 5 to reproduce a speech which reads out a sentence "Reply either yes or no?", stands by for word data belonging to the category "affirmation" or "negation" to be supplied, and shifts the process to one of the individual transition destinations in the discrimination process step QB16, QB17 or QB18 according to the category of the supplied word data (discrimination process step QB19, QB20 or QB21).

In the input/output process step SP17, SP18 or SP19, the agent processing unit 7 causes the speech output unit 5 to read out a sentence "Will give a guide", and sends a control signal instructing to display information indicating the current position of the vehicle on the map and the position of the restaurant, searched in the input/output process step EX51, EX52 or EX53, on the map to the navigation unit 61. The navigation unit 61 displays information indicative of the current position of the vehicle on the map and the position of the restaurant on the map, and starts giving a guide for the restaurant (step EX8, EX9 or EX10).

In the input/output process step SP16, the agent processing unit 7 causes the speech output unit 5 to read out sentences "You are selfish. Will search for restaurant information on Web". Then, the agent processing unit 7 access an external network via the local communication control device, and searches for information indicating the position of a restaurant with the current position taken as a reference (input/output process step EX7). When corresponding information is searched, the navigation unit 61 is allowed to display information indicating the current position of the vehicle on the map and the position of the restaurant on the map.

As mentioned above, because the speech recognition unit 2 adds the score to word data to be supplied to the agent processing unit 7, and the process transitions according to the contents of a wire having the largest product S·J of the weighting factor J and the score S, the flow may jump and a process different from the aforementioned order may be executed. If a transition constant k is set to a high value to some extent with respect to a wire which has a process item to be a trigger as a preceding process item, the weighting factor J of this wire becomes a high value as a result, so that a jump becomes likely to occur, and the agent processing unit 7 can cope with a sudden topical change. For example, when the user utters "not interesting" after it recognizes the input speech "onaka hetta (meaning stomach is hungry in Japanese)" and questions "go eating?", a product S·J of a recognition score S of a word "not interesting" set to a wire corresponding to a process item of acquiring word data of the word "not interesting" and the weighting factor J is calculated, and the product S·J of the score S of the word set to a wire linked to a discrimination process "go eating?" and the weighting factor J is also calculated (of course, calculations are made for the individual other wires). If the product obtained for the word "not interesting" indicates the largest value as a result, the agent processing unit 7 jumps the flow of processes, and the process transitions to a process item following a process item of acquiring word data of the word "not interesting".

If data and a wire representing the contents of a process are described appropriately, the aforementioned agent device can respond to the natural utterance of the user, appropriately determine what control should be applied to which device, and apply control according to the result of the discrimination to a device.

The structure of the agent device is not limited to the above-described one.

For example, the word database D3 may store not only data representing a word, but also data representing a phrase of plural words, as an element of the word database D3, or may store data representing a part of a word or a phoneme, as an element of the word database D3. A word or the like should not necessarily be grouped under a specific concept, and even in a case where grouping is done, data to be used for carrying out grouping may not take the form of a category dictionary.

The speech recognition unit 2 may recognize only certain words, and directly supplies recognized words to the agent processing unit 7 instead of supplying results of recognizing all speeches uttered by the user to the natural language analyzer 3 (word spotting method). In this case, the agent device need not to have the natural language analyzer 3.

The agent processing unit 7 may determine a category to which plural words belong based on how those plural words are combined and included in the same sentence. In this case, the agent processing unit 7 may store a table having a data structure which is, for example, shown in FIG. 18, and determine the category of grouped plural words by referring to the table. The table exemplified in FIG. 18 indicates that if words "onaka (meaning stomach in Japanese)" and "hetta (meaning hungry in Japanese)" are included in the same sentence for example, those two words are treated as belonging to the a category "eating" as long as a process relating to the sentence is executed. When words "setting" and "destination" are included in the same sentence, those two words are treated as belonging to the category "navigation setting" as long as a process relating to the sentence is executed.

The agent processing unit 7 may change the transition constant k corresponding to a wire in accordance with a predetermined rule based on the number of times that a transition represented by the wire has been executed or the like, and rewrite the wire so that the weighting factor J becomes a value calculated based on the changed transition constant k.

Specifically, for example, the wire database D5 stores the number of executions of a transition represented by each wire, with respect to that wire. The agent processing unit 7 rewrites the value of the number every time the transition is executed, thereby incrementing the value of the number by 1, and rewrites the transition constant k corresponding to each wire to a value which is proportional to, for example, the number stored for the wire.

It has been explained in the aforementioned embodiment that conditions set to wires are set to individual wires, but is not limited to those. For example, conditions for individual wires may be described in a discrimination process. In this case, to which wire each condition corresponds should be specified beforehand.

The agent processing unit 7 may change data to be output in a discrimination process and an input/output process in accordance with data passed to those processes, data input through those processes, and other optional conditions.

The agent device may have a display apparatus (for example, a liquid crystal display or the like) for outputting an image under the control of the agent processing unit 7, and the agent processing unit 7 may control the display apparatus in such a way that it displays a predetermined image for each process in the input/output process and the discrimination process.

The agent processing unit 7 may comprise a plurality of data processing units (e.g., computers or the like) which are connected to one another and bear a flow formed generally by various processes, such as a trigger acquisition process, a discrimination process, and an input/output process, and wires. In this case, it is sufficient that each data processing unit which constitutes the agent processing unit 7 stores data representing that portion in the overall flow executable by the agent processing unit 7 which is probably executed by the unit, as elements of the process item database or the wire database. If data to be stored in each data processing unit is such data that macro-defines that portion of the process which is executed by the data processing unit, it is easy to cause a plurality of data processing units to perform distributed processing.

The agent device may plurally include the speech input unit 1, and the natural language analyzer 3 or the speech output unit 5.

The speech input unit 1 may have a recording medium drive unit (e.g., a floppy (registered trademark) disk drive, a CD-ROM drive or an MO drive) which reads a waveform signal from a recording medium (e.g., a floppy (registered trademark) disk, a CD (Compact Disc), an MO (Magneto-Optical Disk)) where data representing speeches is recorded, and supplies the signal to the natural language analyzer 3.

The agent device is not limited to the control of the car navigation system for example, and may control other devices. Therefore, it may control the control device of an in-vehicle device, may control an air conditioning device like an air conditioner, and may control opening/closing of a window which opens and closes by the power of a motor, turning on/turning off of a light, and starting/stopping of a electrical wiper.

It may control an audio device. For example, it is applicable to the control of radio tuning, and the control of a recording medium drive device which reproduces speeches and images recorded in a recording medium, such as a CD (Compact Disc), an MD (Mini Disc), or a DVD (Digital Versatile Disc), as a possible control of an audio device.

Possible and specific embodiment of audio device control is that, for example, combinations (for example, "music piece" and "change", "another", and "music piece", "different" and "music piece", and so on) of words constituting expressions (e.g., "change the music piece", "another music piece", "different music piece", and so on) possibly used for instruction by the user who wants to change a music piece being reproduced by a CD player is categorized in a category "music piece change" by using a category dictionary, and when a combination of words belonging to the category "music piece change" is uttered during reproduction of a music piece recorded in a CD by the CD player and word data representing the individual corresponding words is supplied to the agent processing unit 7 from the speech recognition unit 2 through the natural language analyzer 3, the agent processing unit 7 responds to this (specifically, the process transitions to a process item following a trigger acquisition process of acquiring word data belonging to the category "music piece change"), and a control signal of instructing changing the truck in reproduction is sent to the CD player, etc., Words "change", "another", "different" may set to one wire together with a word "music" as conditions. Accordingly, the score of a word corresponding to an input speech is directly set to a wire by the natural language analyzer 3. If word data supplied from the natural language analyzer 3 is for a word "music piece" and a word "change", scores are set to individual wires. Calculation results of the wires are obtained based on the set scores. In this case, all scores may be summed up, or an average value may be obtained. The same goes for the case where each word is categorized in the aforementioned category, and the calculation results of the wires are obtained by multiplications of the individually obtained score and weighting factors set to the wires, and a status is to transition to a wire which indicates the largest value of the calculation result.

Another possible embodiment is that when the agent processing unit 7 causes the speech output unit 5 to output a speech "Is this music piece OK?" and then word data of words (e.g., "yes", "fine", "OK", and the like) belonging to a category "affirmation", or words (e.g., "no", "not", "don't", "different", and the like) belonging to a category "contradiction" is supplied, reproduction and stop of a music piece is instructed to the CD player in accordance with the category of the supplied word data.

Second Embodiment

The user may utter cryptic expressions in some cases. For example, a word "not interesting" may be uttered for intending various demands like "music play", "music change", "shopping" or "eating". The explanation will be given to an agent device of the second embodiment of the invention which specifies the intention of an instruction when the instruction in such a cryptic expression is uttered.

The physical constitution of the agent device is substantively the same as the constitution of the first embodiment shown in, for example, FIG. 1. The input/output target device group 6, however, does not include a CD player in addition to the navigation unit 61 and the clock 62. Provided that at least a part of categories defined by the category dictionary is associated with at least any device belonging to the input/output target device group 6.

When word data representing a word "not interesting" is supplied to the agent processing unit 7 of the agent device, the agent processing device 7 searches for a category to which the word "not interesting" belongs. As a result, for example, provided that it belongs to four categories "music play", "music change", "shopping", and "eating", next, the agent processing unit 7 acquires information indicating the current operation status of a device which is associated with the categories among the devices belonging to the input/output target device group 6.

If the acquired information indicates that the CD player reproduces no speech, the agent processing unit 7 causes the speech output unit 5 to generate a speech "Play music? Or, go shopping? Go eating?" for example, thereby prompting to select any of the three categories "music play", "shopping", "eating" except "music change" among the aforementioned four categories.

As the user utters "play CD" or other words belonging to a category "CD play", and a sentence including such words, and word data of words belonging to the category "CD play" is supplied to the agent processing unit 7, the agent processing unit 7 shifts the process to a process following a trigger acquisition process of acquiring word data of words belonging to the category "CD play". As a result, for example, a speech "CD will be played" is generated by the speech output unit 5, and a control signal for instructing reproduction of the speech is sent to a CD player.

As the user utters a sentence including a word "song", "Want to listen to some "song"", or other words belonging to the category "music" and a sentence including such words, and word data of words belonging to the category "music" is supplied to the agent processing unit 7, the agent processing unit 7 shifts the process to a process following a trigger acquisition process of acquiring word data of words belonging to the category "music".

Likewise, as the user utters words belonging to the category "eating" or a sentence including such words, and word data of words belonging to the category "eating" is supplied to the agent processing unit 7, the agent processing unit 7 shifts the process to a process following a trigger acquisition process of acquiring word data of words belonging to the category "eating". In this case, the process transitions to the status of, for example, QB3 shown in FIG. 11.

If the information indicating the current operation status of the device belonging to the input/output target device group 6 indicates that the CD player is reproducing a speech, the agent processing unit 7 makes the speech output unit 5 generate a speech "Change music? Or, go shopping? Go eating?" for example, thus prompting selection of any of the three categories "music change", "shopping", "eating", except "music play" among the aforementioned four categories.

The agent device of the second embodiment of the invention appropriately specifies the user's intention based on a speech representing the cryptic instruction of the user by performing the aforementioned operation.

Third Embodiment

The agent devices of the individual embodiments adequately determine the demand of the user, and derive the user's demand from a cryptic instruction, thus controlling a device. The user, however, may need not only determination of a demand just unilaterally uttered by himself/herself, but also someone to talk to. For example, it is considerable that the user who drives a car alone may feel such a necessity. Conversation using a cellular phone during driving is dangerous, and there is a problem such that phone charges run up.

Such problems can be resolved if an agent device becomes the other party for conversation. An agent device of the third embodiment of the invention which accomplishes conversation with the user will be explained.

The physical constitution of the agent device is substantively the same as the constitution of the aforementioned first embodiment. However, the input/output target device group 6 of the agent device shall include a radio receiver which receives FM multiple broadcastings, extracts text information, and supplies it to the agent processing unit 7 as needed, or a receiver including a terminal which acquires text information through an external communication line, and supplies it to the agent processing unit 7 as needed, and the agent processing unit 7 shall store text information supplied from the radio receiver or the terminal in its local non-volatile memory. When the stored text information is read out, data indicating the reading out shall be generated and stored.

For example, as a trigger acquisition process of acquiring word data representing words "Is there any news?" is executed, for example, a process explained below is executed as a process following the trigger acquisition process.

For example, if there is text information not yet read out among text information stored in the local non-volatile memory, the agent processing unit 7 causes the speech output unit 5 to generate a speech which reads out a message notifying the genre of the corresponding text information (e.g., "there are news regarding sports and social economies" or the like).

If the received text information includes information indicating a classification beforehand, the genre of the corresponding text information is specified based on this. If not, the agent processing unit 7 determines based on the contents of the corresponding information. Specifically, for example, for text information including the contents like "the executive of the oo party was forced to be replaced because of corruption . . . ", it is determined as the report of a city news page based on the words "oo party", and "corruption". Likewise, for text information including the contents like "the stock price of the oo joint stock corporation rises suddenly because of the announcement of financial statements announced by that company, it is determined as the report of an economic page based on the words "announcement of financial statements", and "stock price". For text information including the contents like "oo (team name) of the soccer won on oo (when) game, and has come within championship", it is determined as the report of a sports page based on the words "soccer", "game", "championship".

As a collection of word data indicating a sentence "let me know the news on sports" uttered by the user is supplied, the agent processing unit 7 causes the speech output unit 5 to generate a speech which reading out a sentence reflecting the report of a sports page not yet read out among text information locally stored (for example, "oo (team name) of the soccer won on oo (when) game, and has come within championship", or the like).

Text information received as news often uses expressions like "~sita" at the end of a sentence, so that it is not appropriate for normal conversations. Accordingly, text information is not directly read out, but may be read out with the last portion of a sentence being replaced with a word which is likely to be used as the last portion of a conversation between friends, such as "ndatte".

When making the speech output unit 5 read out text information, the agent processing unit 7 may cause the speech output unit to read out only a part of text information (e.g., initial paragraph), wait that the user utters a speech for requiring the detail of the text information (e.g., a speech of asking a question "Is there more detailed information?"), and make the speech output unit to read the remaining part in response to the utterance when the user utters.

In response that the user utters a speech of requesting the detail of the text information, the agent processing unit 7 may search for text information locally stored, determine whether the entire sentence has already been read out or not, and makes the speech output unit generate a speech "No. This is it so far" when determining that the entire sentence has been read, or make the speech output unit generate a speech "Yes, so that the entire sentence will now be read" when there is a detailed part, and then make it generate a speech which reads out the detailed part.

When the user utters a speech including a question about text information read out by the speech output unit 5, the agent processing unit 7 may respond to this, search for one, which can be a replay to the inquiry, from text information locally stored, and make the speech output unit 5 read it out. For example, when the user utters a question "Against which team did it win the game?", text information which commentates the result of that game is searched, and if found, this text information is read out. When the user asks "When is the next game?", text information which commentates the schedule of the next game is searched, and if found, it is read out or the like.

As a result, when the user asks "Is it possible to get a ticket?", the agent processing unit 7 specifies the "team name" and the "game day" based on the contents of the conversation with the user so far, makes the speech output unit 5 generate a speech like "It will be checked for a moment", connects to a ticket sales site through an external network or the like, and makes reference about presence or absence of the corresponding ticket.

As a result, when a reply that the corresponding ticket is still available is obtained, the agent processing unit 7 makes the speech output unit 5 read out a speech which explains the sales status of the ticket like "It is fine so far. ooYEN at o seat, purchase it?" thus prompting the user to reply. In response, when the user utters words meaning affirmation like "purchase it", "order it", or "buy it", the agent processing unit responds to word data representing those words, and the process proceeds to a process of supporting purchase of the ticket (e.g., a well known process of supporting net settlement or the like).

In contrast, when a reply that the ticket is already sold out is obtained, the agent processing unit 7 makes the speech output unit 5 read out a sentence like "sorry, but all booked up", terminates successive processes, and if there is text information not yet output other than that, the process proceeds to a process of outputting the corresponding information.

The agent device of the third embodiment of the invention not only performs control desired by the user, but also realizes conversation with the user by performing the aforementioned operation. The conversation between the agent device and the user is applicable to an audio device. For example, the audio device acquires information through the Internet or the like, and stores it in a memory based on an artist condition registered by the user beforehand. The acquired information is classified based on the artist condition. As the user asks like "Is there new information?", the agent device searches for the memory contents, and suggests information not yet suggested by speech output if there is the information not yet suggested. Of course, at this time, it may involve image information. For example, if the new information is information on a new album, the agent device further confirms purchasing of the album with the user, takes an action of purchasing to an Internet CD shop in such a way that it will be purchased if a comprehension is obtained. Likewise, if it is concert information, the agent device confirms purchasing of the ticket of the concert with the user, and takes an action of purchasing to an Internet ticket shop in such a way that it will be purchased. Those speech recognition processes or the like are executed based on the aforementioned embodiments.

The embodiments of the invention have been explained, and any of the following processes indicated in the aforementioned embodiments or execution of combining those enables appropriate recognition of speeches of various expressions uttered by the user and execution of a corresponding process.

1. To each wire, set words treated as the same meaning at the wire as plural conditions.

2. Set a category under which one or plural words are classified to each wire.

3. Set words having different meanings or categories to each wire as plural conditions.

4. When plural words are included in the same sentence (input speech), treat only categories to which those words commonly belong as the categories to which those words belong, thus enabling figuring out intensions of uttering of those words according to a context.

5. Treat a category that word data has as the meaning of the word data.

6. When data acquired at a trigger acquisition process is word data, a condition set to a wire describes a category under which a word represented by the word data is grouped, instead of the word represented by the word data.

7. When it is not possible to determine the meaning of an input speech, prompt an input by an expression easier for determination.

8. Change the contents suggested to the user based on information externally acquired.

A device control device according to the invention can be realized not only by an exclusive system but also an ordinary computer system.

For example, the agent device that executes the above-described processes can be constructed by installing a program for executing the operations of the speech input unit 1, the natural language analyzer 3, the speech synthesis processing unit 4, the speech output unit 5 and the agent processing unit 7 into a personal computer connected to the input/output target device group 6 from a recording medium where the program is stored. The personal computer that executes the program executes flows shown in, for example, FIG. 9A as processes equivalent to the operation of the agent device in FIG. 1.

The program that allows a personal computer to perform the functions of the agent device may be uploaded to, for example, a bulletin board system (BBS) of a communication line, and distributed via the communication line, or a carrier may be modulated with a signal representing the program, the acquired modulated wave may be transmitted, and a device which receives the modulated wave demodulates the modulated wave to restore the program. Then, the above-described processes can be executed by invoking the program, and running the program like other application programs under the control of the OS.

When the OS bears a part of the processes, or the OS constitutes a part of a single constituting element of the invention, a program excluding that part may be stored in a recording medium. In this case, it is also assumed that according to the invention, a program for executing the individual functions or steps to be executed by the computer is stored in the recording medium.

The present invention is based on Japanese Patent Application No. 2003-436976, filed on Dec. 26, 2003, and includes the specification, the claims, the drawings, and the abstract. The disclosure of the application is entirely incorporated in this specification by reference.

INDUSTRIAL APPLICABILITY

The present invention is available for various device control devices or the like which can respond to an instruction uttered in the form of a language by a human being and control a device.

The invention claimed is:

1. A device control device comprising:
speech recognition means which acquires speech data representing a speech and specifies words candidates included in the speech by performing speech recognition on the speech data and calculates a likelihood of each of the specified words candidates;
specifying means which specifies words included in the speech based on the likelihoods calculated by the speech recognition means and specifies a content of the speech uttered by an utterer based on the words specified;
a database which stores preceding controls, subsequent controls, and weighting factors, each of which is associated with one another; and
process execution means which specifies content of a subsequent control to be performed on an external device to be a control target based on a currently executed control, a weighting factor stored in association with the currently executed control and the content of the uttered speech specified by the specifying means, and performs the subsequent control,
wherein the process execution means obtains the weighting factor by calculating a product of transition constants defined on routes from the currently executed control to the subsequent control associated with the currently executed control, writes the obtained weighting factor into the database, and, among the subsequent controls stored in the database associated with the currently executed control, identifies a control in which a product is a largest product of the weighting factor and the calculated likelihood.

2. The device control device according to claim 1, wherein the speech recognition means includes speech part specifying means which specifies a part of speech of the specified words, and
the specifying means specifies a content of the speech uttered by the utterer based only on those of the words specified by the speech recognition means which are specified as a predetermined part of speech.

3. The device control device according to claim 2, wherein the specifying means discriminates whether or not a combination of a plurality of words in the words specified by the speech recognition means which are specified as a predetermined part of speech meets a predetermined condition, and specifies a content of the speech uttered by the utterer based on a discrimination result.

4. The device control device according to claim 1, wherein the specifying means holds information which associates words with one or more categories, and specifies a content of the speech uttered by the utterer based on a category in which the words specified by the speech recognition means are classified.

5. The device control device according to claim 1, wherein the specifying means holds correlation information which associates words of different meanings or different categories with each process of the process execution means, and specifies a content of the speech uttered by the utterer based on a combination of those words or categories which are specified by the speech recognition means, and the correlation information.

6. The device control device according to claim 1, wherein the specifying means holds information which associates words with one or more categories, and specifies a content of the speech uttered by the utterer based on a category in which a plurality of words specified by the speech recognition means are commonly classified.

7. The device control device according to claim 1, wherein the specifying means holds a plurality of words assigned to respective processes of the process execution means, and performs a corresponding process when at least one of the words specified by the speech recognition means is a word assigned to the process.

8. The device control device according to claim 1, wherein when a meaning of an input speech is not discriminatable, the specifying means prompts an input in a more discriminatable expression.

9. The device control device according to claim 1, further comprising information acquisition means which acquires information from an external device,
wherein the specifying means selects an output content to be output based on the information acquired by the information acquisition means.

10. A device control device according to claim 1 further comprising:
information acquisition means which acquires information via predetermined communication means; and
speech output means which outputs a speech based on the information acquired by the information acquisition means, whereby when the control specified by the process execution means is to output the information acquired by the information acquisition means, the speech output means outputs a speech based on the information.

11. The device control device according to claim 10, wherein the process execution means specifies a process to be performed based on the specified content of the uttered speech.

12. The device control device according to claim 11, wherein the process execution means includes means which, when the process specified as a process to be performed is a process of presenting information externally received to the utterer, performs the presentation by generating a speech which reads out the information.

13. The device control device according to claim 1 so constructed as to be mountable on a vehicle having an on-vehicle device mounted thereon, wherein the process extension means specifies a content of control to be performed on the on-vehicle device based on the specified content of the uttered speech, and performs the specified control.

14. The device control device according to claim 13, further comprising:
information acquisition means which acquires information via predetermined communication means; and
speech output means which outputs a speech based on the information acquired by the information acquisition means, whereby when the control specified by the process execution means is to output the information acquired by the information acquisition means, the speech output means outputs a speech based on the information.

15. The device control device of claim 1 incorporated in a navigation device so constructed as to be mountable on a vehicle,
wherein the process execution means specifies a content of a navigation process to be performed based on the specified content of the uttered speech, and performs the specified navigation process.

16. The device control device according to claim 15, further comprising:
information acquisition means which acquires information via predetermined communication means; and
speech output means which outputs a speech based on the information acquired by the information acquisition means,
whereby when the navigation process specified by the process execution means is to output the information acquired by the information acquisition means, the speech output means outputs a speech based on the information.

17. The device control device according to claim 1 incorporated in an audio device,
wherein the process execution means specifies a content of a speech process to be performed based on the specified content of the uttered speech, and performs the specified speech process, or controls an external device in such a way as to cause the external device to perform the specified speech process.

18. The device control device according to claim 17, further comprising:
information acquisition means which acquires information via predetermined communication means; and
speech output means which outputs a speech based on the information acquired by the information acquisition means,
whereby when the speech process specified by the process execution means is to output the information acquired by the information acquisition means, the speech output means outputs a speech based on the information.

19. A device control method, comprising:
performing, in a computer:
a speech recognition step of acquiring speech data representing a speech and specifying words candidates included in the speech by performing speech recognition on the speech data and calculating a likelihood of each of the specified words candidates;
a specifying step of specifying words included in the speech based on likelihoods specified in the speech recognition step and specifying a content of the speech uttered by an utterer based on the specified words; and
a process execution step of specifying content of a subsequent control to be performed on an external device to be a control target based on a currently executed control, a predetermined subsequent control, a weighting factor associated with the currently executed control, and the specified content of the uttered speech, and performing the subsequent control, wherein the process execution step obtains the weighting factor by calculating a product of transition constants defined on routes from the currently executed control to the subsequent control associated with the currently executed control, and, among the subsequent controls associated with the currently executed control, identifies a control in which a product is a largest product of the weighting factor and the calculated likelihood.

20. The device control method according to claim 19, further comprising:
an information acquisition step of acquiring information via a predetermined communication device; and
a speech output step of outputting a speech based on the information acquired in the information acquisition step,
whereby when the control specified in the process execution step is to output the information acquired in the information acquisition step, a speech is output based on the information in the speech output step.

21. The device control method according to claim 19, wherein the process execution step specifies a process to be performed based on the specified content of the uttered speech.

22. The device control method according to claim 19 for controlling an on-vehicle device mounted on a vehicle,
wherein the process execution step specifies a content of control to be performed on the on-vehicle device based on the specified content of the uttered speech, and performs the specified control.

23. The device control method according to claim 22, further comprising:
an information acquisition step of acquiring information via a predetermined communication device; and
a speech output step of outputting a speech based on the information acquired in the information acquisition step,
whereby when the control specified in the process execution step is to output information acquired in the information acquisition step, a speech is output based on the information in the speech output step.

24. The device control method of claim 19 for controlling a navigation device mounted on a vehicle,
wherein the process execution step specifies a content of a navigation process to be performed based on the specified content of the uttered speech, and performs the specified navigation process.

25. The device control method according to claim 24, further comprising:
an information acquisition step of acquiring information via a predetermined communication device; and
a speech output step of outputting a speech based on the information acquired in the information acquisition step,
whereby when the navigation process specified in the process execution step is to output the information acquired in the information acquisition step, a speech is output based on the information in the speech output step.

26. The device control method of claim 19 for controlling an audio device,
wherein the process execution step specifies a content of a speech process to be performed based on the specified content of the uttered speech, and performs the speech process, or controls an audio device in such a way as to cause the audio device to perform the specified speech process.

27. The device control method of claim 26, further comprising:
an information acquisition step of acquiring information via a predetermined communication device; and
a speech output step of outputting a speech based on the information acquired in the information acquisition step,
whereby when the speech process specified in the process executing step is to output information acquired in the information acquisition step, a speech is output based on the information in the speech output step.

28. A non-transitory recording medium storing a program which allows a computer to function as:
speech recognition means which acquires speech data representing a speech and specifies words candidates included in the speech by performing speech recognition on the speech data and calculates a likelihood of each of the specified words candidates;
specifying means which specifies words included in the speech based on likelihoods calculated by the speech recognition means and specifies a content of the speech uttered by an utterer based on the specified words
a database which stores preceding controls, subsequent controls, and weighting factors, each of which is associated with one another therein; and
process execution means which specifies content of a subsequent control to be performed on an external device to be a control target based on a currently executed control, a weighting factor stored in association with the currently executed control, and the content of the uttered speech specified by the specifying means, and performs the subsequent control, wherein the process execution means obtains the weighting factor by calculating a product of transition constants defined on routes from the currently executed control to the subsequent control associated with the currently executed control, writes the obtained weighting factor into the database, and, among the subsequent controls stored in the database associated with the currently executed control, identifies a control in which a product is a largest product of the weighting factor and the calculated likelihood.

29. The non-transitory recording medium according to claim 28, further storing a program causing the computer to function as:
information acquisition means which acquires information via predetermined communication means; and
speech output means which outputs a speech based on the information acquired by the information acquisition means,
whereby when the control specified by the process execution means is to output the information acquired by the information acquisition means, the speech output means outputs a speech based on the information.

30. The non-transitory recording medium according to claim 28,
wherein the process execution means specifies a process to be performed based on the specified content of the uttered speech.

31. The non-transitory recording medium according to claim 28, wherein the computer is incorporated in an on-vehicle device control device so constructed as to be mountable on a vehicle,
wherein the process execution means which specifies a content of control to be performed on the on-vehicle device based on the specified content of the uttered speech, and performs the control.

32. The non-transitory recording medium according to claim 31, further storing a program causing the computer to function as:
information acquisition means which acquires information via predeteimined communication means; and
speech output means which outputs a speech based on the information acquired by the information acquisition means,
whereby when the control specified by the process execution means is to output information acquired by the information acquisition means, the speech output means outputs a speech based on the information.

33. The non-transitory recording medium according to claim 28, wherein the computer is incorporated in a navigation device so constructed as to be mountable on a vehicle,
wherein the process execution means specifies a content of a navigation process to be performed based on the specified content of the uttered speech, and performs the specified navigation process.

34. The non-transitory recording medium according to claim 33, further storing a program causing the computer to function as:
information acquisition means which acquires information via predetermined communication means; and
speech output means which outputs a speech based on the information acquired by the information acquisition means,
whereby when the navigation process specified by the process execution means is to output information acquired by the information acquisition means, the speech output means outputs a speech based on the information.

35. The non-transitory recording medium according to claim 28,
wherein the process execution means specifies a content of a speech process to be performed based on the specified content of the uttered speech, and performs the specified speech process, or controls an external device in such a way as to cause the external device to perform the specified speech process.

36. The non-transitory recording medium according to claim 35, further storing a program causing the computer to function as:
information acquisition means which acquires information via predetermined communication means; and
speech output means which outputs a speech based on the information acquired by the information acquisition means,
whereby when the speech process specified by the process execution means is to output information acquired by the information acquisition means, the speech output means outputs a speech based on the information.

* * * * *